(12) United States Patent
Hamada

(10) Patent No.: US 6,978,242 B2
(45) Date of Patent: *Dec. 20, 2005

(54) RADIO TRANSMISSION DEVICE AND METHOD, RADIO RECEIVING DEVICE AND METHOD, RADIO TRANSMITTING/RECEIVING SYSTEM, AND STORAGE MEDIUM

(75) Inventor: Osamu Hamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 623 days.

This patent is subject to a terminal disclaimer.

(21) Appl. No.: 09/940,551

(22) Filed: Aug. 27, 2001

(65) Prior Publication Data

US 2002/0065043 A1    May 30, 2002

(30) Foreign Application Priority Data

Aug. 28, 2000  (JP)  .............................. 2000-256617

(51) Int. Cl.⁷ ............................................ G10L 21/00
(52) U.S. Cl. ...................................... 704/503; 709/247
(58) Field of Search ......................................... 455/41

(56) References Cited

U.S. PATENT DOCUMENTS 5,864,678 A    1/1999  Riddle
6,021,198 A    2/2000  Anigbogu et al.
6,798,447 B1 *  9/2004  Katsuki ................. 348/208.12
2001/0041056 A1 * 11/2001  Tanaka et al. ................. 386/95
2002/0000831 A1 *  1/2002  Smith .......................... 326/39
2004/0169665 A1 *  9/2004  Sakashita et al. ........... 345/629

FOREIGN PATENT DOCUMENTS

WO    WO 98 28891    7/1998

* cited by examiner

Primary Examiner—Creighton Smith
(74) Attorney, Agent, or Firm—Frommer Lawrence & Haug LLP; William S. Frommer; Thomas F. Presson

(57)    ABSTRACT

Disclosed herein is a radio transmission device comprising data inputting means for inputting transmission data, data storing means for storing the inputted transmission data temporarily, data compression means for reading data from the data storing means to compress the data, and data transmitting means for transmitting the compressed data through a radio line. With this configuration, a real-time signal in a radio transmission system, in which effective throughput is not guaranteed like ACL link of Bluetooth can be transmitted and received. Delay of data transmission caused by a change in throughput of the line is absorbed by the data storing means. In addition, controlling a compression rate in response to the change in throughput enables transmission with an optimum data rate.

38 Claims, 21 Drawing Sheets

PROTOCOL STACK

DATA FRAME

RADIO TRANSMISSION DEVICE AND METHOD, RADIO RECEIVING DEVICE AND METHOD, RADIO TRANSMITTING/RECEIVING SYSTEM, AND STORAGE MEDIUM

BACKGROUND OF THE INVENTION

The present invention relates to a radio transmission device, a radio receiving device, a radio transmitting/receiving system, and a storage medium, which are used for transmitting a real time signal such as sound and image by means of a radio communication method. In particular, the present invention relates to a radio transmission device, a radio receiving device, a radio transmitting/receiving system, and a storage medium, which are used for transmitting a real time signal while keeping data quality of the signal by means of a radio communication method.

More specifically, the present invention relates to a radio transmission device, a radio receiving device, and a radio transmitting/receiving system, which are used for transmitting a real time signal such as sound and image in a radio transmission system where effective throughput fluctuates (that is to say, it is not guaranteed) like ACL link (Asynchronous Connection Less Link) of Bluetooth. In particular, the present invention relates to a radio transmission device, a radio receiving device, and a radio transmitting/receiving system, which are capable of transmitting a real time signal while keeping its data quality in a transmission system where effective throughput fluctuates like the ACL link of the Bluetooth.

Recently, short-distance radio communication technology is becoming highlighted. According to this kind of radio communication method, cordless communication between equipment and a terminal can be established. Therefore, connection work between pieces of equipment is simplified. In addition, because it is not necessary to choose an installation location for each equipment, this kind of radio communication method is very convenient. Short-distance radio communication is also highly expected to be a transmission medium, which is placed in a local location where construction of a network cable is not realistic like, for example, a home network, etc.

For example, the short-distance radio communication can be used for the following: data exchange between pieces of portable information equipment; and transmission of data and sound between a main body of a telephone (or a portable music player) and a headset, between a main phone and a cordless handset, and between others.

"Bluetooth", which is a representative example of the short-distance radio communication, uses a radio frequency of 2.45 GHz band. Data transmission speed is 1 Mbps as a whole, in which a synchronous transmission channel of 64 kbps available for telephone voice transmission and an asynchronous transmission channel for data transmission are provided. The former synchronous transmission channel adopts SCO (Synchronous Connection Oriented Link) transmission method, and is applied to line connection. On the other hand, the latter asynchronous transmission channel adopts ACL (Asynchronous Connection Less Link) transmission method, and is applied to data transmission using packet switching.

A range of connection between pieces of equipment by the Bluetooth is about 10 m. However, the range can be extended up to 100 m using an additional amplifier. The Bluetooth is based on point-to-point connection between master equipment and slave equipment, or point-to-multi-point connection. In the latter case, one master can communicate with seven slaves at a maximum by means of the SCO or the ACL method.

For example, there may be an application that communicates between pieces of equipment for handling a real time signal such as sound and image (high fidelity audio, etc.) using the Bluetooth.

However, there is a high possibility that transmission throughput fluctuates on a radio transmission channel. Therefore, in order to transmit a real time signal without interruption of sound and image by means of the radio communication method, it is necessary to make enough allowance for line quality. As a result, maximum throughput of a line cannot be used effectively.

Concerning information communication, in general, on the transmission side, transmission data is encoded and compressed; and on the receiving side, received data is decoded (to be more specific, Codec processing is performed). In addition, a compression rate is changed in response to the line quality. However, in this case, the change is based on the concept that when allowance of throughput becomes small, the data compression rate is increased. Because of it, it is necessary to know the allowance of throughput.

At this point, the following case will be considered: a real time signal such as sound and image is transmitted using the short-distance radio communication such as the Bluetooth.

As described above, the Bluetooth has two kinds of transmission methods: the SCO and the ACL. If the SCO method based on line connection is used, no retransmission request is issued regardless of whether or not there is an error correction. Therefore, sound quality and image quality are not guaranteed. In contrast to this, the ACL is a packet transmission method. When an error occurs (or when the error is not corrected by error correction), an error-free state is realized by packet retransmission. Therefore, sound quality and image quality can be guaranteed. In other words, the ACL method can be said to be suitable for transmission of a real time signal because data quality is guaranteed, and because sound and image can be transmitted satisfactorily without interruption.

However, the ACL method is a link of Best Effort type. Therefore, as a trade-off for guarantee of data quality, a situation, in which latency and throughput cannot be guaranteed when line quality decreases, occurs (for example, when utilizing radio communication at home, operation of ordinary home electric appliances such as microwave oven causes effective throughput to change to a large extent).

In other words, the ACL link in the Bluetooth is a communication system in which effective throughput changes. There is no way of knowing a real-ability value of throughput. Therefore, a mechanism, which determines a data compression rate in response to allowance of throughput, does not hold.

SUMMARY OF THE INVENTION

An object of the present invention is to provide a radio transmission device, a radio receiving device, a radio transmitting/receiving system, and a storage medium, that are outstanding and capable of transmitting a real time signal such as sound and image while keeping its data quality.

Another object of the present invention is to provide, in a radio transmission system of which effective throughput fluctuates (that is to say, it is not guaranteed) like ACL link of Bluetooth, a radio transmission device, a radio receiving device, and a radio transmitting/receiving system, that are outstanding and capable of transmitting a real time signal such as sound and image while keeping data quality.

Still another object of the present invention is to provide, in a transmission system of which effective throughput fluctuates like ACL link of Bluetooth, a radio transmission device, a radio receiving device, and a radio transmitting/receiving system, that are outstanding and capable of transmitting a real time signal such as sound and image while keeping data quality by changing a data compression rate dynamically during a transmission period.

The present invention is devised to take the above-mentioned problems into consideration. A first aspect is a radio transmission device, or method, for transmitting data through a radio line. In this case, said radio transmission device, or method, comprises data inputting means, or step, for inputting transmission data, input data storing means, or step, for storing the inputted transmission data temporarily, data compression means, or step, for reading the temporarily stored data by means of a first-in first-out method to compress the data, and data transmitting means, or step, for transmitting the compressed data through the radio line.

A second aspect of the present invention is a radio transmitting device, or method, for transmitting data through a radio line. In this case, said radio transmitting device, or method, comprises data inputting means, or step, for inputting transmission data, data compressing means, or step, for compressing the inputted transmission data, compressed data storing means, or step, for storing the compressed data temporarily, and data transmitting means, or step, for transmitting the compressed data through the radio line.

In this case, the radio line is, for example, ACL link in Bluetooth. As regards the radio line, a transmission path is unstable. In addition, the ACL link belongs to a Best Effort type that controls retransmission when a transmission-data error occurs. Therefore, effective throughput is not guaranteed. According to the radio transmission device, or method, relating to the first aspect of the present invention, a delay in data transmission resulting from a fluctuation of throughput on the line is absorbed as the input data storing means, or step, accumulates transmission data, which is continuously inputted, temporarily by means of the first-in first-out method.

As an example of the data inputted by the data inputting means, or step, there is a real-time audio signal and a video signal, which are continuously inputted from a microphone and a monitor camera, or a data that is reproduced from a recording medium such as CD-R at given input speed (that is, at reproduction speed); or the like.

The input data storing means or step, or the compressed data storing means, can be configured by using a FIFO (first in first out) memory that is capable of storing transmission data by means of the first-in first-out method. A difference between a data writing location and a data reading location in the FIFO memory is equivalent to the quantity of data accumulated in the FIFO memory. In this case, the difference is almost synonymous with effective throughput.

In addition, the data compression means, or step, compresses data using compression methods such as ATRAC, ATRAC3, AAC, MP3, ADPCM, and the like, and the compression rate may be variable.

As regards the radio communication such as Bluetooth, there is no means for measuring throughput on the line directly. However, effective throughput can be judged by the difference between the data writing location and the data reading location in the input data storing means, or step, that is to say, by the quantity of accumulated data that is not transmitted.

The radio transmission device, or method, according to the first and the second aspects of the present invention may comprise compression rate control means, or step, for controlling data compression rate in the data compression means, or step. By using the compression rate control means, or step, the data compression rate is increased with a decrease in throughput, and the data compression rate is decreased with recovery of the throughput. In such a case, the radio data communication can be optimized by adjusting a data compression rate, that is, a data rate, in such a manner that the radio data communication does not exceed a limit of a memory size of the input data storing means, or step. Moreover, reduction in a memory size in the input data storing means becomes possible.

Or, the radio transmission device, or method, according to the first aspect of the present invention may comprise input speed control means for controlling data input speed in the data inputting means, or step. By using the input speed control means, data input speed is decreased with a decrease in throughput, and the data input speed is increased with recovery of the throughput. In such a case, the radio data communication can be optimized by adjusting data input speed, that is, a data rate, in such a manner that the radio data communication does not exceed a limit of a memory size of the input data storing means, or step. Moreover, reduction in a memory size in the input data storing means, or step, becomes possible. In this case, the data input speed is equivalent to, for example, the data reproduction speed at the time of reproduction from a recording medium such as CD-R.

A third aspect of the present invention is a radio receiving device, or method, for transmitting data through a radio line. In this case, said radio receiving device, or method, comprises data receiving means, or step, for receiving compressed data through the radio line, data decompressing means, or step, for decompressing the received data, output data storing means, or step, for storing the decompressed data temporarily, and data outputting means, or step, for outputting data that has been read by means of a first-in first-out method.

In this case, the radio line is, for example, the ACL link in Bluetooth. As regards the radio line, a transmission path is unstable. In addition, the ACL link belongs to the Best Effort type that controls retransmission when a transmission-data error occurs. Therefore, effective throughput is not guaranteed. According to the radio receiving device, or method, relating to the second aspect of the present invention, a delay in data transmission resulting from a fluctuation of throughput on the line is absorbed as the output data storing means, or step, accumulates transmission data, which is continuously transmitted, temporarily by means of the first-in first-out method.

The data output means, or step, may be configured to output sound and image in real time using, for example, a speaker and a monitor display. Or, the data output means may be configured to record data, which is decompressed and reproduced, in a recording medium such as MD and CD-R at given output speed, that is, at recording speed.

In addition, the output data storing means, or step, can be configured by using the FIFO memory that is capable of storing transmission data by means of the first-in first-out method. A difference between a data writing location and a data reading location in the FIFO memory is equivalent to the quantity of data accumulated in the FIFO memory. In this case, the difference is almost synonymous with effective throughput of the radio line.

In addition, the data decompression means, or step, decompresses data by using the following decompression methods that support compression methods of transmission data such as ATRAC, ATRAC3, AAC, MP3, ADPCM, and the like. However, if a compression rate is changed on the transmission side, data decompression using a parameter for this compression rate is required.

As regards the radio communication such as Bluetooth, there is no means for measuring throughput on the line directly. However, effective throughput can be judged by a difference between a data writing location and a data reading location in the output data storing means, or step.

The radio receiving device, or method, according to the third aspect of the present invention may comprise output speed control means, or step, for controlling output speed in the data outputting means, or step. By using the output speed control means, or step, the data output speed is decreased with a decrease in throughput, and the data output speed is increased with recovery of the throughput. In such a case, the radio data communication can be optimized by adjusting data output speed, that is, a data rate, in such a manner that the radio data communication does not exceed a limit of a memory size of the output data storing means, or step. Moreover, a memory size in the output data storing means, or step, can be reduced. In this case, the data output speed is equivalent to, for example, data reproduction speed at the time of reproduction from a recording medium such as MD and CD-R.

A fourth aspect of the present invention is a radio transmitting/receiving system for transmitting data through a radio line. Said radio transmitting/receiving system comprises a radio transmission unit comprising data inputting means for inputting transmission data, input data storing means for storing the inputted transmission data temporarily by means of a first-in first-out method, data compression means for reading data from the data storing means to compress the data, and data transmitting means for transmitting the compressed data through the radio line and a radio receiving unit comprising data receiving means for receiving transmission data through the radio line, data decompressing means for decompressing the received data, output data storing means for storing the decompressed data temporarily by means of a first-in first-out method, and data outputting means for reading data from the output data storing means to output the data.

In this case, the radio line is, for example, the ACL link in Bluetooth. As regards the radio line, a transmission path is unstable. In addition, the ACL link belongs to the Best Effort type that controls retransmission when a transmission-data error occurs. Therefore, effective throughput is not guaranteed. According to the radio receiving device/method relating to the third aspect of the present invention, a delay in data transmission resulting from fluctuations of throughput on the line can be absorbed as the input data storing means accumulates transmission data, which is continuously transmitted, temporarily by means of the first-in first-out method, and the output data storing means accumulates the receiving data temporarily.

As an example of the data inputted by the data inputting means in the radio transmission unit, there is a real-time audio signal and a real-time video signal, which are continuously inputted from a microphone and a monitor camera, or a data that is reproduced from a recording medium such as CD at given input speed (that is, at reproduction speed); or the like. On the other hand, the data output means in the radio receiving unit may be configured to output sound and image in real time by using, for example, a speaker and a monitor display. Or, the data output means may be configured to record data, which is decompressed and reproduced, in a recording medium such as MD and CD-R at given output speed, that is, at recording speed.

In addition, the input data storing means and the output data storing means are configured by using the FIFO memory that is capable of storing transmission data by means of the first-in first-out method. A difference between a data writing location and a data reading location in the FIFO memory is equivalent to the quantity of unhandled data accumulated in the FIFO memory. In this case, the difference is almost synonymous with effective throughput of the radio line.

In the radio transmission unit, the data compression means compresses data using the following compression methods such as ATRAC, ATRAC3, AAC, MP3, ADPCM, and the like, and the compression rate may be variable.

The radio transmission/receiving system according to the fourth aspect of the present invention may comprise compression rate control means for controlling a data compression rate in the data compression means. By using the compression rate control means, the data compression rate is increased with a decrease in throughput, and the data compression rate is decreased with recovery of the throughput. In such a case, the radio data communication can be optimized by adjusting a data compression rate, that is, a data rate, in such a manner that the radio data communication does not exceed a limit of a memory size of the input data storing means. Moreover, a memory size in the input data storing means can be reduced.

However, the data decompressing means of the radio receiving unit must decompress data using an expansion method supporting a compression method and a compression rate, which are used by the data compression means on the radio transmission unit side. Because of it, when changing a compression rate in the radio transmission unit, it is necessary to provide compression rate notifying means for notifying the radio receiving unit of a compression rate parameter.

Or, the radio transmission/receiving system according to the third aspect of the present invention may comprise input speed control means for controlling data input speed in the data inputting means. By using the input speed control means, data input speed is decreased with a decrease in throughput, and the data input speed is increased with recovery of the throughput. In such a case, the radio data communication can be optimized by adjusting a data input speed, that is, a data rate, in such a manner that the radio data communication does not exceed a limit of a memory size of the input data storing means. Moreover, a memory size in the input data storing means can be reduced. In this case, the data input speed is equivalent to, for example, data reproduction speed at the time of reproduction from a recording medium such as CD.

Or, the radio transmission/receiving system according to the third aspect of the present invention may comprise output speed control means for controlling data output speed in the data outputting means. By using the output speed control means, data output speed is decreased with a decrease in throughput, and the data output speed is increased with recovery of the throughput. In such a case, the radio data communication can be optimized by adjusting a data output speed, that is, a data rate, in such a manner that the radio data communication does not exceed a limit of a memory size of the output data storing means. Moreover, a memory size in the output data storing means can be reduced. In this case, the data output speed is equivalent to, for example, data recording speed at the time of recording on a recording medium such as MD and CD-R.

A fifth aspect of the present invention is a storage medium for storing computer software, by which processing of data transmission through a radio line is performed on a computer system, physically in a computer readable form, wherein said computer software comprises a data inputting step for inputting transmission data, an input data storing step for storing the inputted transmission data temporarily, a data compression step for reading data from the data storing means to compress the data, and a data transmitting step for transmitting the compressed data through the radio line.

A storage medium according to the fifth aspect of the present invention is, for example, a medium for providing a general-purpose computer system, which can execute various kinds of program codes, with computer software in a computer readable form. Such a medium is, for example, a removable and portable storage medium such as CD (Compact Disc), FD (floppy disc), and MO (Magneto-Optical disc). Or, it is also technically possible to provide a specific computer system with the computer software through a transmission medium, or the like, such as a network (including a radio network and a cable network).

The program storage medium like this defines a synergistic relationship between the computer software and the storage medium from functional and structural viewpoints, which aims to realize a function of given computer software on the computer system. In other words, by installing the given computer software in the computer system through the storage medium according to the fifth aspect of the present invention, a synergistic effect is achieved on the computer system. Thus, the same effect as that of the radio transmission device, or method, according to the first aspect of the present invention can be achieved.

Other purposes, characteristics, and advantages, relating to the present invention, will be made clear by more detailed explanation, which is based on embodiments of the present invention described later and attached diagrams.

DETAILED DESCRIPTION OF THE PREFERRED EMBODIMENTS

Embodiments of the present invention will be detailed with reference to drawings as follows.

Figure 1:
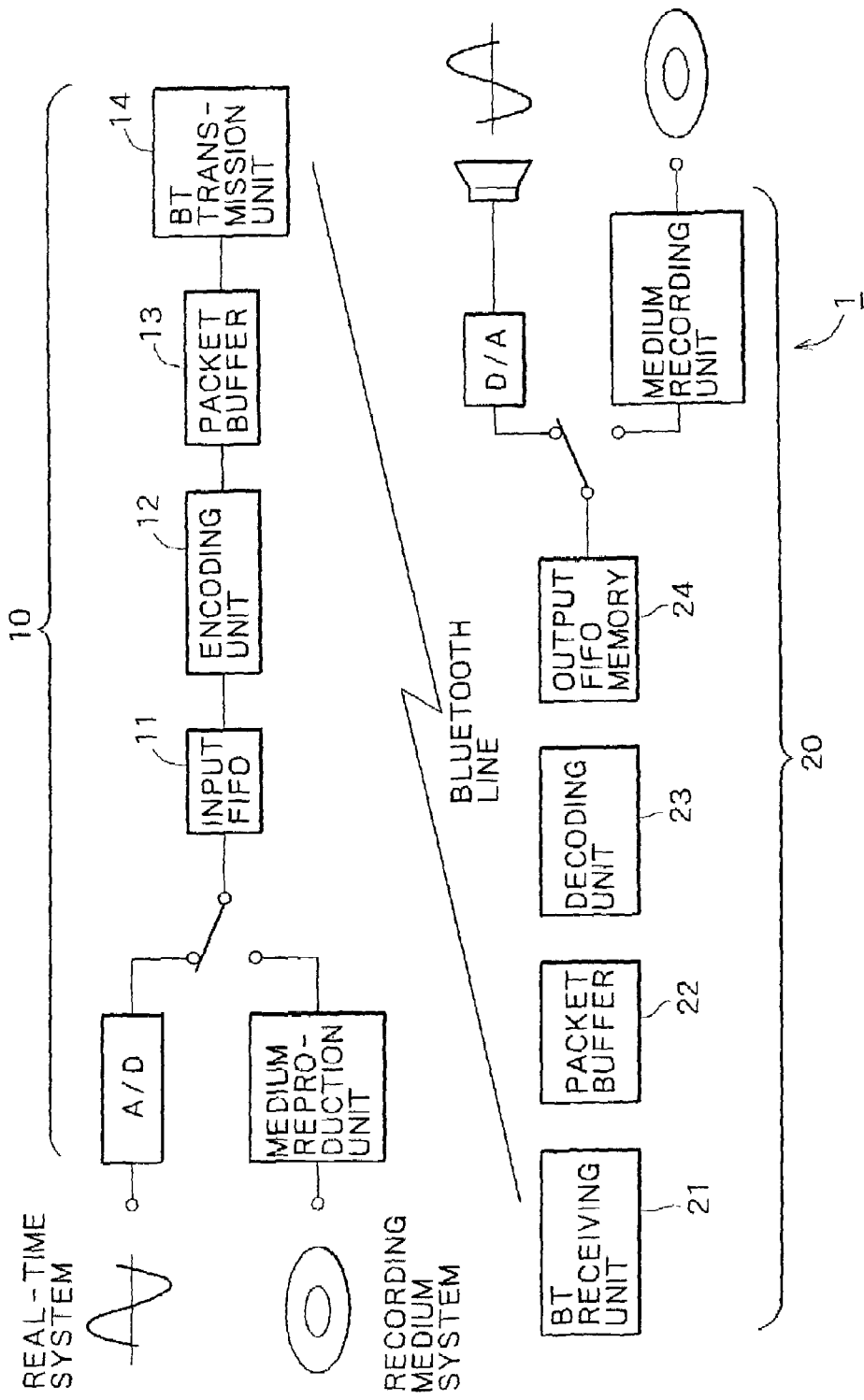
FIG. 1 is a diagram schematically illustrating a configuration of a radio transmitting/receiving system 1 that is provided as an embodiment of the present invention.

FIG. 1 schematically illustrates a configuration of a radio transmitting/receiving system 1 that is provided as an embodiment of the present invention. The radio transmitting/receiving system 1 shown in FIG. 1 can be suitably applied to transmission of an audio signal as a real time signal. The radio transmitting/receiving system 1 comprises a pair of units: a radio transmission side 10, and a radio receiving side 20. The radio transmission side 10 and the radio receiving side 20 are connected to each other using, for example, a short-distance radio line such as a Bluetooth line (described above).

The radio transmission side 10 may use a real-time signal source including an analog input from a microphone or other audio input devices, and may also use a real-time signal source from a broadcast receiver. Or, the radio transmission side 10 may use a signal, which is reproduced from a recording medium such as CD (Compact Disc), as a signal source.

On the other hand, as regards the radio receiving side 20, there is a case where an audio output device such as a speaker and a headphone are connected so that audio listening becomes possible in real time. Or, there is a case where an audio signal is recorded in a recording medium such as MD and CD-R as it is.

The radio transmission side 10 comprises: an input FIFO memory 11 for temporarily storing a real-time audio signal that is supplied from an audio signal source using a first-in first-out method; an encoding unit 12 for encoding and compressing the audio signal; a packet buffer 13 for temporarily storing only one packet of the encoded data; and a BT transmission unit 14 for transmitting the packet through the Bluetooth line.

The input FIFO memory 11 comprises buffers that are arranged using the first-in first-out method. Each of the buffers accumulates audio data, of which quantity is equivalent to for example 0.5 seconds. However, if an audio signal is inputted as an analogue signal, the audio signal is converted into a digital signal using an A/D converter before writing it to the input FIFO memory 11.

A compression method, which is adopted by the encoding unit 12, is not particularly limited when realizing the present invention. However, in order to realize CD quality, it is desirable to adopt, for example, ATRAC (Adaptive transform acoustic coding), ATRAC3, AAC, MP3 (MPEG-1 Audio Layer-III), ADPCM, and the like. A bit rate is about 64 to 400 kbps.

The BT transmission unit 14 performs best-effort-type packet communication with the radio receiving side 20 through the Bluetooth line using an ACL link of Bluetooth. As a throughput of the ACL link in the Bluetooth line, about 700 kbps can be obtained under ideal communication conditions. However, the throughput will decrease gradually depending on the conditions.

Figure 2:
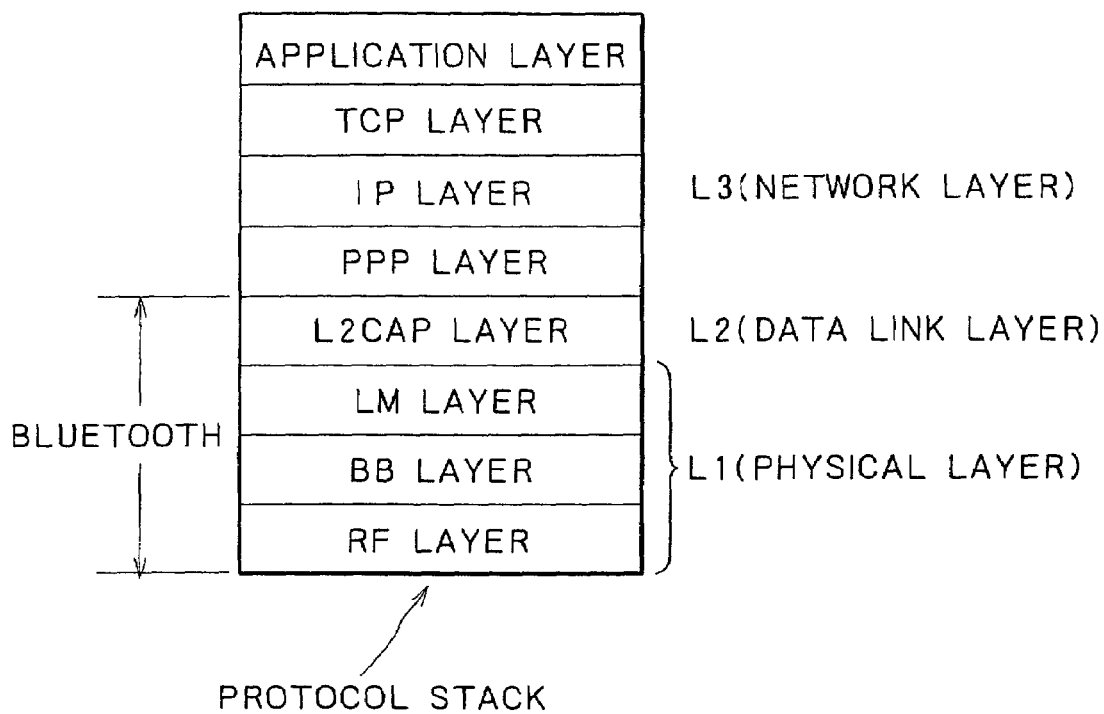
FIG. 2 is a diagram schematically illustrating a protocol stack structure in Bluetooth line.

FIG. 2 schematically illustrates a protocol stack structure in the Bluetooth line. This protocol stack comprises a RF layer, a baseband (BB) layer, a link manager (LM) layer, and a L2CAP (Logical Link Control and Adaptation Protocol) layer in order starting from the lowest layer. This corresponds to a physical layer and a data link layer in OSI (Open Systems Interconnection) basic reference model.

In the L2CAP layer, when an error occurs (or when the error is not recovered by error correction) procedures of packet retransmission are performed between transmission and reception to realize an errorless state. In other word, if quality of the transmission line decreases, an error occurrence rate increases. In proportion to this, packet retransmission occurs frequently resulting in a decrease in effective throughput of the Bluetooth line.

Returning to FIG. 1 again, a configuration of the radio receiving side 20 will be described. The radio receiving side comprises: a BT receiving unit 21 for receiving a packet through the Bluetooth line; a packet buffer 22; a decoding unit 23 for decoding and decompressing the received encoded data; and an output FIFO memory 24 for temporarily storing the decoded audio signal using the first-in first-out method.

The BT receiving unit 21 performs best-effort-type packet communication with the radio transmission side 10 through the Bluetooth line using the ACL link of Bluetooth. To be more specific, when failing in reception of a packet, the BT receiving unit 21 issues a packet retransmission request to the BT transmission unit 14. If quality of the transmission line decreases, an error occurrence rate increases. In proportion to this, packet retransmission occurs frequently resulting in a decrease in the effective throughput (as described above).

The decoding unit 23 decodes and decompresses the encoded data that has been received. The decoding and decompressing are supported by the encoding method adopted in the encoding unit 12. As an encoding method, ATRAC, ATRAC3, AAC, MP3 (MPEG-1 Audio Layer-III), ADPCM, and the like, are adopted (as described above).

The output FIFO memory 24 comprises buffers that are arranged using the first-in first-out method. Each of the buffers accumulates audio data, of which quantity is equivalent to for example 0.5 seconds, and temporarily stores the decoded audio signal using the first-in first-out method.

The audio signal, which has been accumulated in the output FIFO memory 24, is read at a sampling cycle for example, and is D/A converted into an analog signal before it is audio output through the speaker. Or, the audio signal, which is kept as a digital signal without D/A conversion, is recorded in a recording medium such as MD and CD-R.

According to the configuration shown in FIG. 1, even if the effective throughput on the Bluetooth line connected between the radio transmission side 10 and the radio receiving side 20 decreases, the radio transmission side 10 can avoid a loss of data by accumulating the real-time audio signal in the input FIFO memory 11. In addition, even if receiving data is interrupted on the radio receiving side 20, it is possible to prevent interruption of the audio data (frame dropping) by outputting the data accumulated in the output FIFO memory 24.

Generally, writing and reading operations of the FIFO memory are controlled using a writing pointer (hereinafter referred to as WP) indicating a location, that is, an address, where the next data is written, and using a reading pointer (hereinafter referred to as RP) indicating an address where the next data is read. Moreover, a difference between the WP and the RP is equivalent to quantity of data that is currently accumulated in the FIFO memory. In other word, if the difference between the WP and the RP exceeds a memory size, data cannot be written any more, which will result in a loss of data.

Here, operation of the input FIFO memory 11 and the output FIFO memory 24 shown in FIG. 1 will be described.

Figure 3:
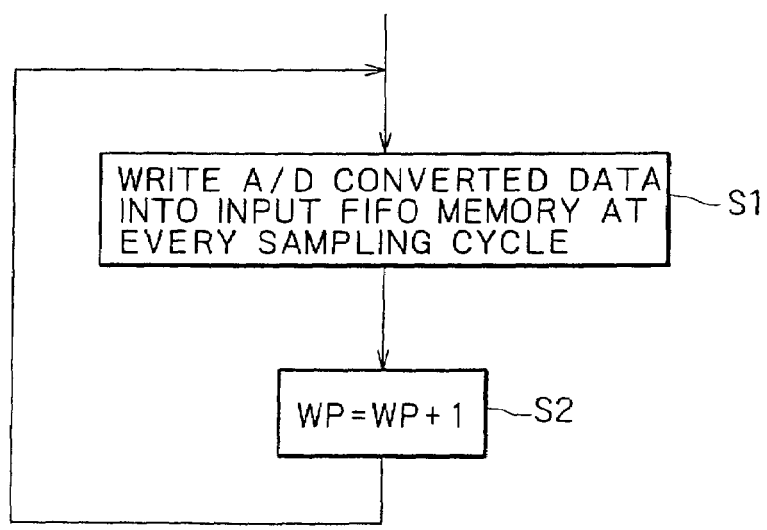
FIG. 3 is a flowchart illustrating processing procedures for controlling a writing pointer WP of an input FIFO memory 11.
Figure 4:
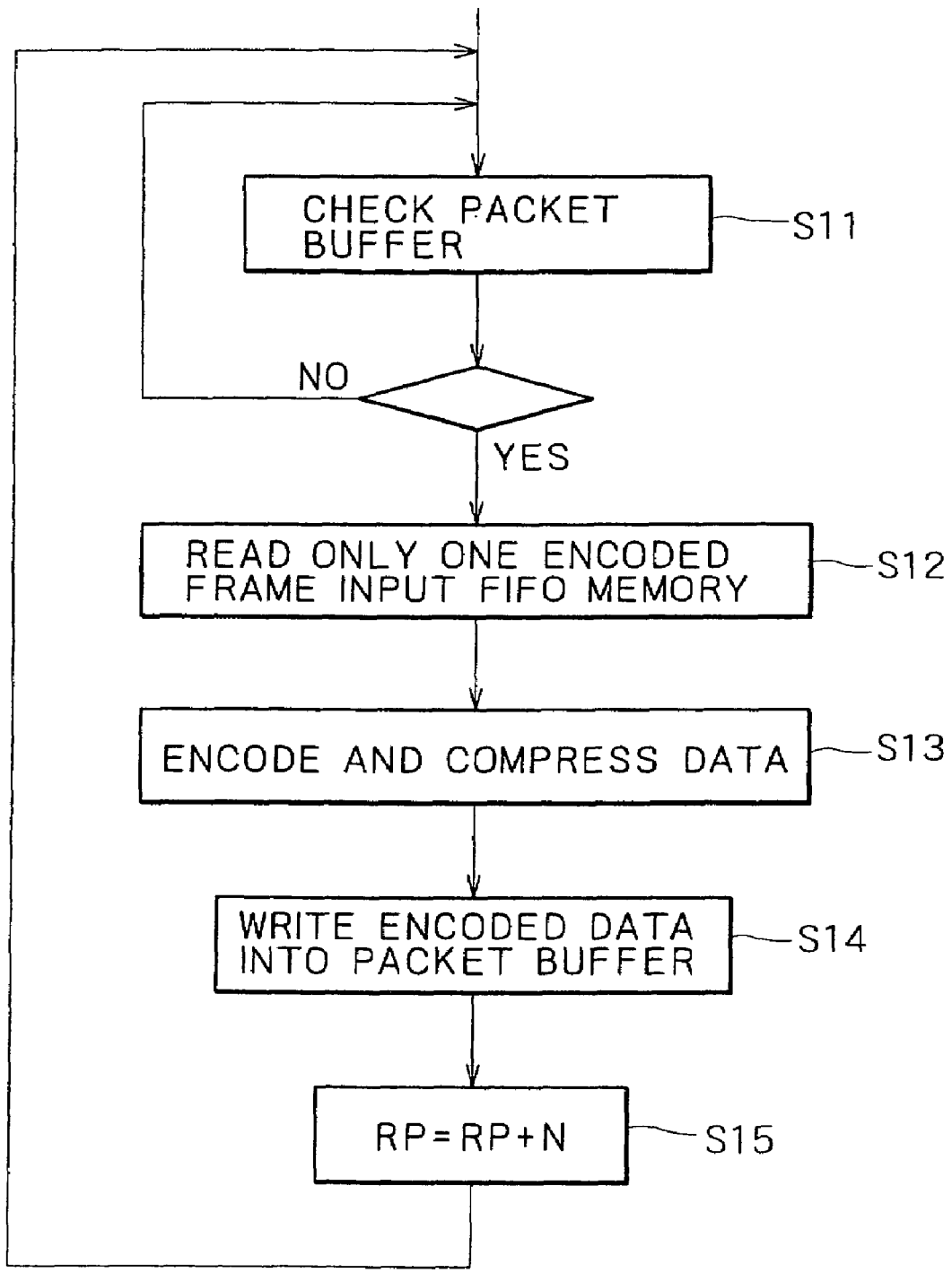
FIG. 4 is a flowchart illustrating processing procedures for controlling a reading pointer RP of an input FIFO memory 11.

FIG. 3 illustrates processing procedures for controlling a writing pointer WP of the input FIFO memory 11, which are used when a real-time audio signal is handled, in the form of a flowchart. In addition, FIG. 4 illustrates processing procedures for controlling a reading pointer RP of the input FIFO memory 11 in the form of a flowchart. Operation characteristics of the input FIFO memory 11 will be described with reference to FIGS. 3 and 4 as follows.

An audio signal, which is inputted in a real time system, A/D converted at every sampling cycle, and is written to an address indicated by the writing pointer WP of the input FIFO memory 11 (step S1). After that, the WP is incremented by one (step S2), and similar processing is repeatedly performed.

On the other hand, the packet buffer 13 on the output side of the input FIFO memory 11 is checked (step S11). If the packet buffer 13 is in a state in which transmission is permitted, only one encoded frame is read from an address indicated by the reading pointer RP of the input FIFO memory (step S12).

After the read data is encoded and compressed in the encoding unit 12 (step S13), the data is written to the packet buffer 13 (step S14). Then, the process will be in a transmission waiting state.

After incrementing the reading pointer RP by N (step S15), which is equivalent to a number of the read frames, the process returns to the step S11. Then, the same processing as that described above is performed repeatedly.

Figure 5:
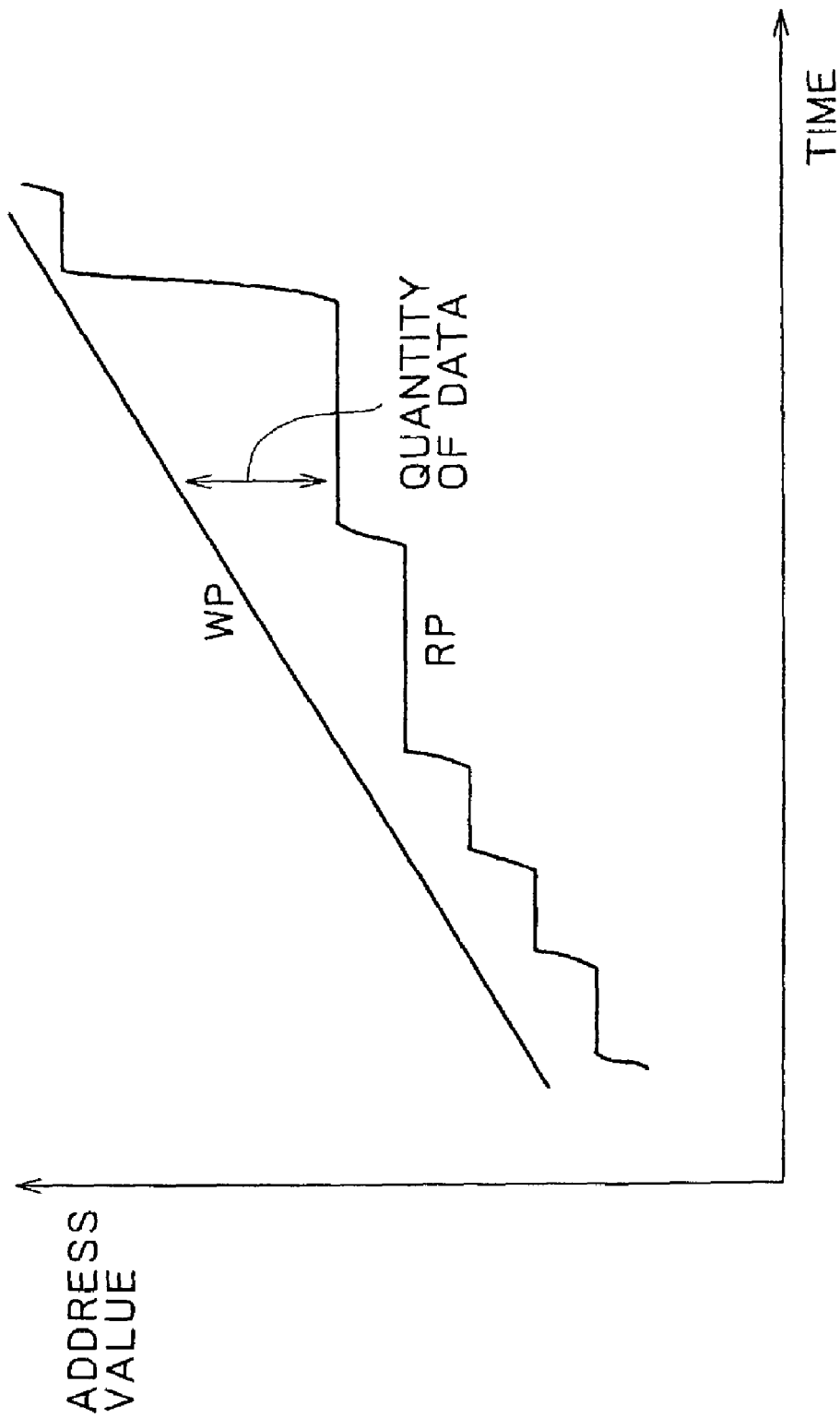
FIG. 5 is a diagram illustrating how a writing pointer WP and a reading pointer RP in an input FIFO memory 11 change.

FIG. 5 illustrates how the writing pointer WP and the reading pointer RP in the input FIFO memory 11 change.

Because the audio signal is inputted in real time in this example, the address of the writing pointer WP increments in proportion to time.

On the other hand, reading from the reading pointer RP depends on whether or not the packet buffer 13 is in a writable state. In other words, it depends on which state the Bluetooth line is, either in a transmittable state or in a transmission waiting state. Therefore, an address of the reading pointer RP increments fast in a state in which an effective throughput of the Bluetooth line is high. However, if the effective throughput decreases, movement of the RP becomes slow and stops.

If the time period over which the movement of the RP is slow continues long, a difference between the WP and the RP gradually increases. As described above, WP minus RP is equivalent to quantity of data accumulated in the input FIFO memory 11. Therefore, on the assumption that the effective throughput decreases, it is necessary to determine a size of the input FIFO memory 11. Moreover, if an increase in the difference between the WP and the RP exceeds a memory size, a loss of a real time signal occurs. In addition to it, a phenomenon of a discontinuous output signal, such as sound skipping and frame dropping, will occur on the radio receiving side 20.

As regards a required size of the input FIFO memory 11, for example, if total storage capacity is quantity of audio data equivalent to 500 mS, a required memory capacity is equal to 88.2 KB (=44.1 KHz×16 bit×2 ch×500 mS/8).

In addition, the writing pointer WP and the reading pointer RP only have to be configured to point at all locations of the input FIFO memory 11. It is assumed that writing speed WP is at 176 KB/S(44100×16×2), and reading of the memory makes an access, for example, at every eight bits, reading occurs with a frequency of 5.7 $\mu$S (=1 Sec/44.1 KHz/2 ch/2 (16 bit/8 bit)) on average. Because reading is performed in a burst for each data encoding frame, speed about ten times or more as much as the above-mentioned numerical value is required in reality. This speed is regarded as within a range that can be easily realized.

Figure 6:
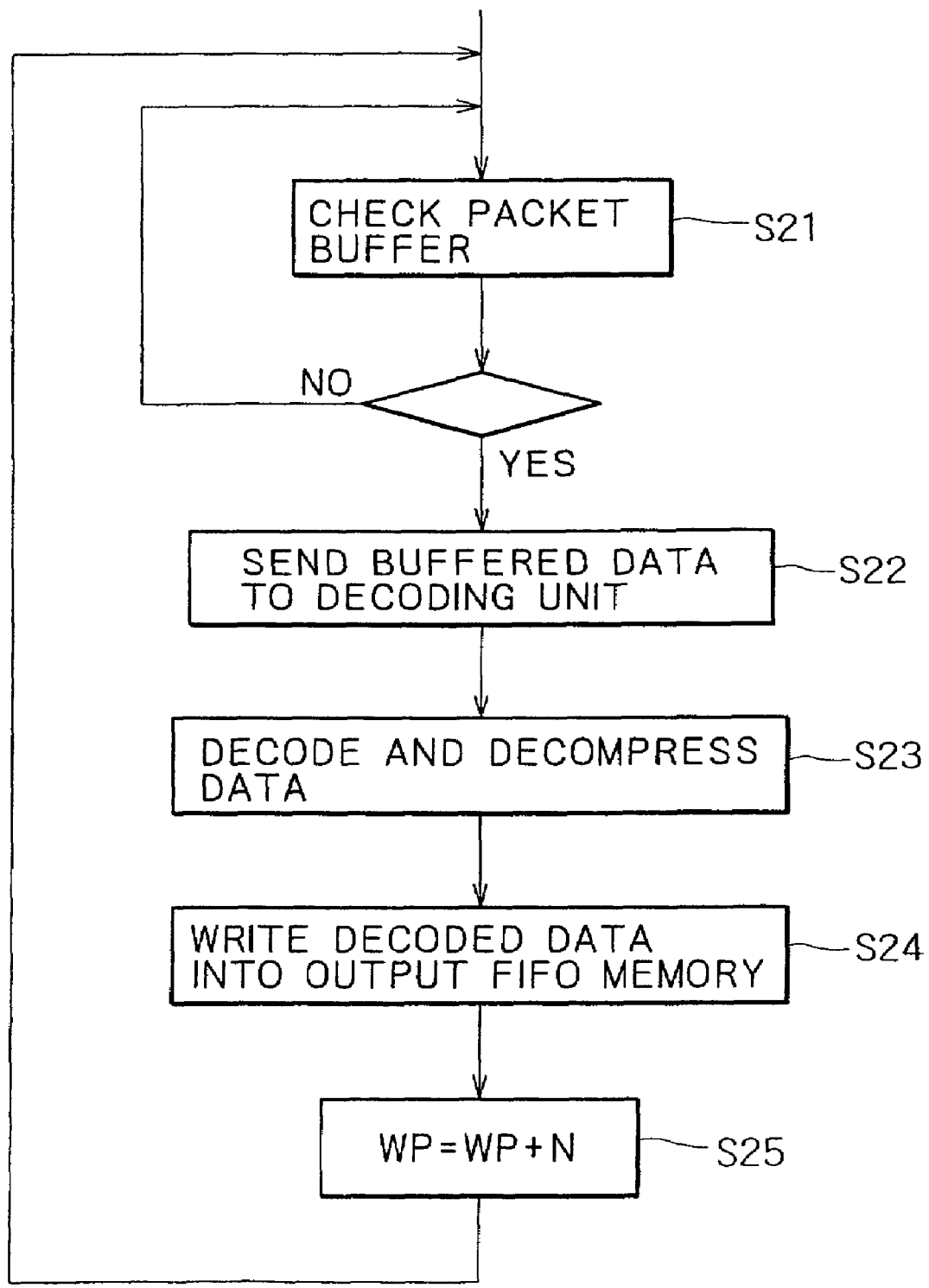
FIG. 6 is a flowchart illustrating processing procedures for controlling a writing pointer WP of an output FIFO memory 24.
Figure 7:
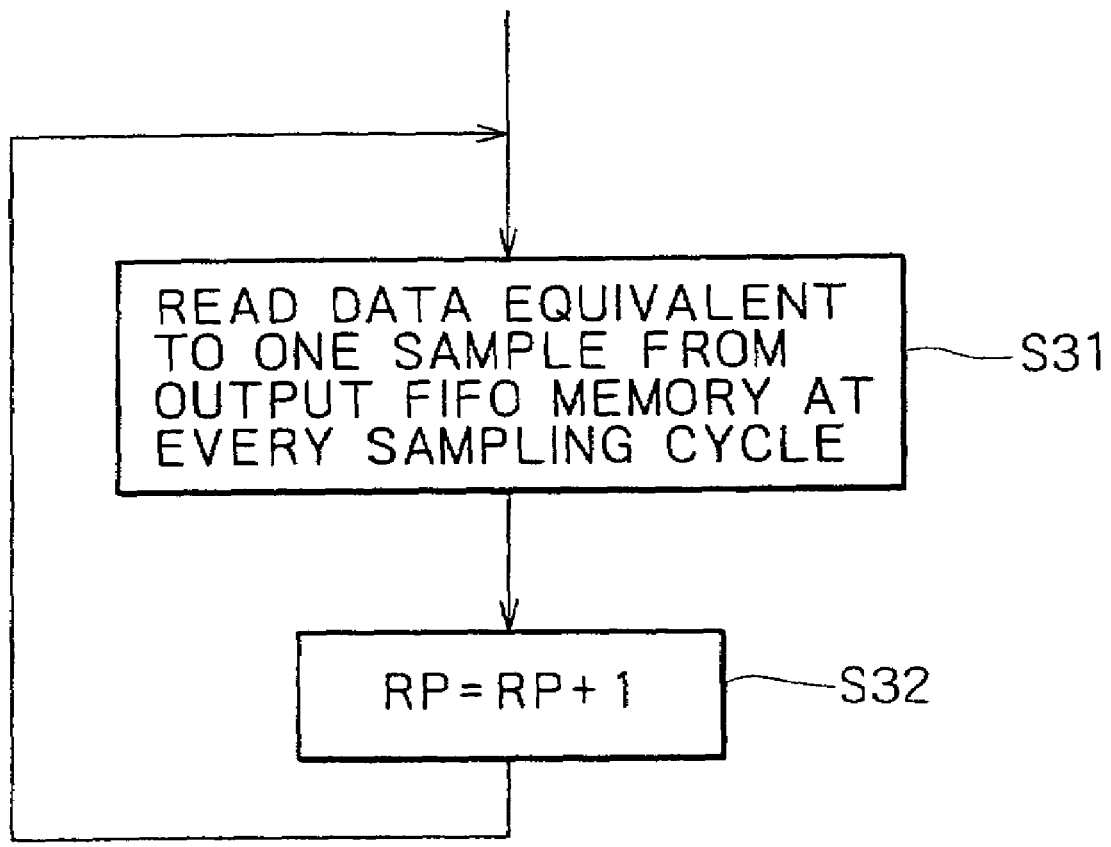
FIG. 7 is a flowchart illustrating processing procedures for controlling a reading pointer RP of an output FIFO memory 24.

FIG. 6 illustrates processing procedures for controlling a writing pointer WP of the output FIFO memory 24, which are used when a real-time audio signal is handled, in the form of a flowchart. In addition, FIG. 7 illustrates processing procedures for controlling a reading pointer RP of the output FIFO memory 24 in the form of a flowchart. Operation characteristics of the output FIFO memory 24 will be described with reference to FIGS. 6 and 7 as follows.

Whether or not the packet buffer 22 is full is checked on the input side of the output FIFO memory 24 (step S21). Whether or not the packet buffer 22 has sufficient unused capacity depends on the effective throughput of the Bluetooth line.

If the packet buffer 22 does not have sufficient unused capacity, the buffered data is transferred to the decoding unit 23 (step S22), where the data is decoded and decompressed (step S23).

Next, one coded frame is written to an address indicated by the writing pointer WP of the output FIFO memory 24 (step S24). After incrementing the writing pointer WP by N (step S25), which is equivalent to a number of the written frames, the process returns to the step S21. Then, the same processing as that described above is performed repeatedly.

On the other hand, on the output side of the output FIFO memory 24, data equivalent to one sample (for example, 16 bits×2 ch) is read from an address indicated by the reading pointer RP at every sampling cycle (step S31). The read data is D/A converted for example, and then is audio output through the speaker.

After that, the RP is incremented by one (step S32), and similar processing is repeatedly performed.

Figure 8:
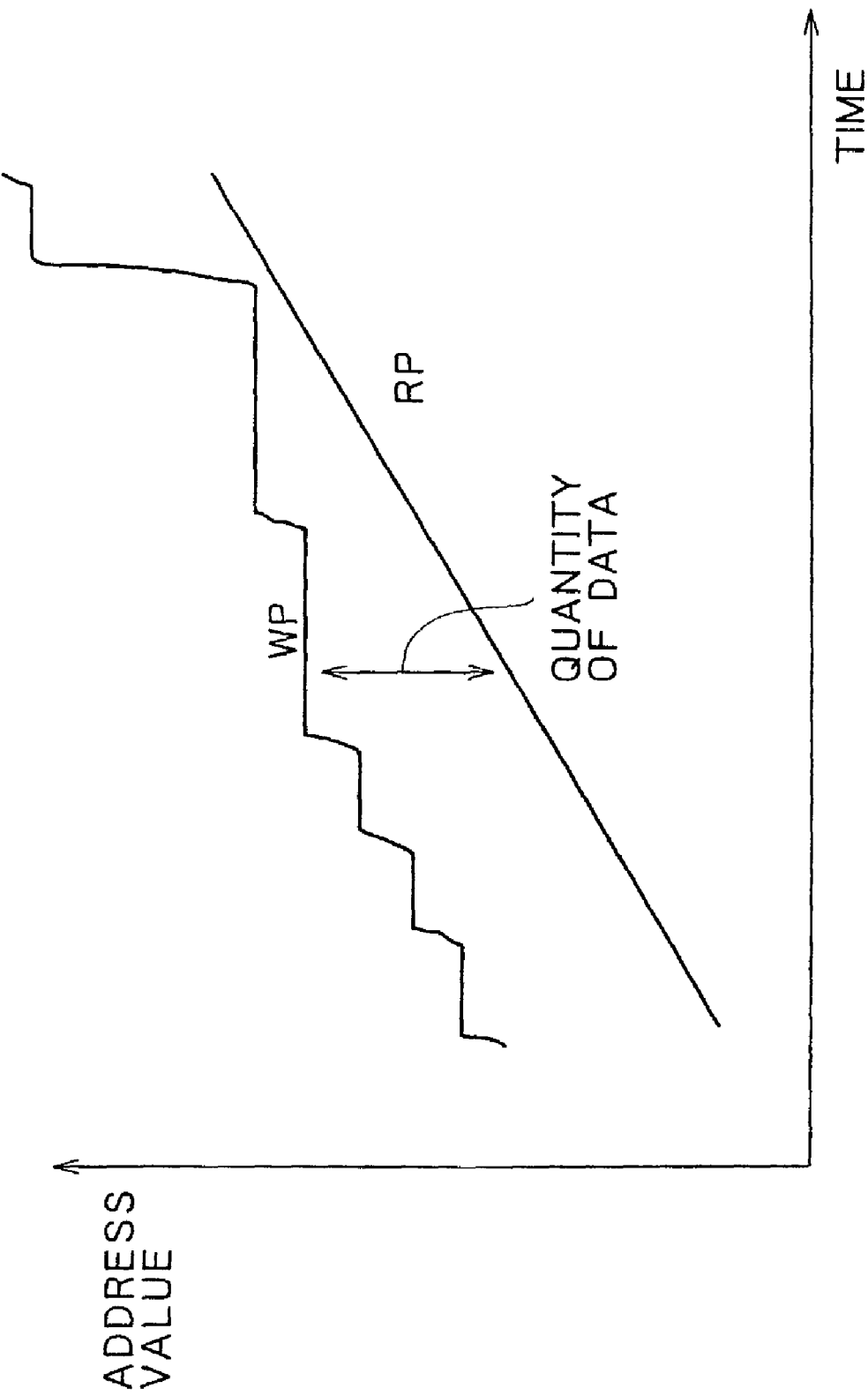
FIG. 8 is a diagram illustrating how a writing pointer WP and a reading pointer RP in an output FIFO memory 24 change.

FIG. 8 illustrates how the writing pointer WP and the reading pointer RP in the output FIFO memory 24 change.

Because the audio signal is output in real time in this example, the address of the reading pointer RP increments in proportion to time.

On the other hand, writing to the writing pointer WP depends on whether or not the packet buffer 22 placed in front is full; in other words, it depends on whether or not the effective throughput of the Bluetooth line is high. To be more specific, an address of the writing pointer WP increments fast in a state in which the effective throughput of the Bluetooth line is high. However, if the effective throughput decreases, movement of the WP becomes slow and stops.

If the time period over which the movement of the WP is slow continues long, a difference between the WP and the RP gradually decreases. As described above, WP minus RP is equivalent to quantity of data accumulated in the output FIFO memory 24. Therefore, when the RP reaches the WP, the output FIFO memory 24 will be in a state in which there is no accumulated data, causing a phenomenon of discontinuous output data such as sound skipping and frame dropping.

As regards a required size of the output FIFO memory 24, for example, if total storage capacity is quantity of audio data equivalent to 500 mS, a required memory capacity is equal to 88.2 KB (=44.1 KHz×16 bit× 2 ch×500 mS/8).

In addition, the writing pointer WP and the reading pointer RP only have to be configured to point at all locations of the output FIFO memory 24. It is assumed that reading speed RP is at 176 KB/S(44100×16×2), and reading of the memory makes an access, for example, at every eight bits, writing occurs with a frequency of 5.7 $\mu$S (=1 Sec/44.1 KHz/2 ch/2 (16 bit/8 bit)) on average. Because writing is performed in a burst for each data decoding frame, speed about ten times or more as much as the above-mentioned numerical value is required in reality. This speed is regarded as within a range that can be easily realized.

Figure 9:
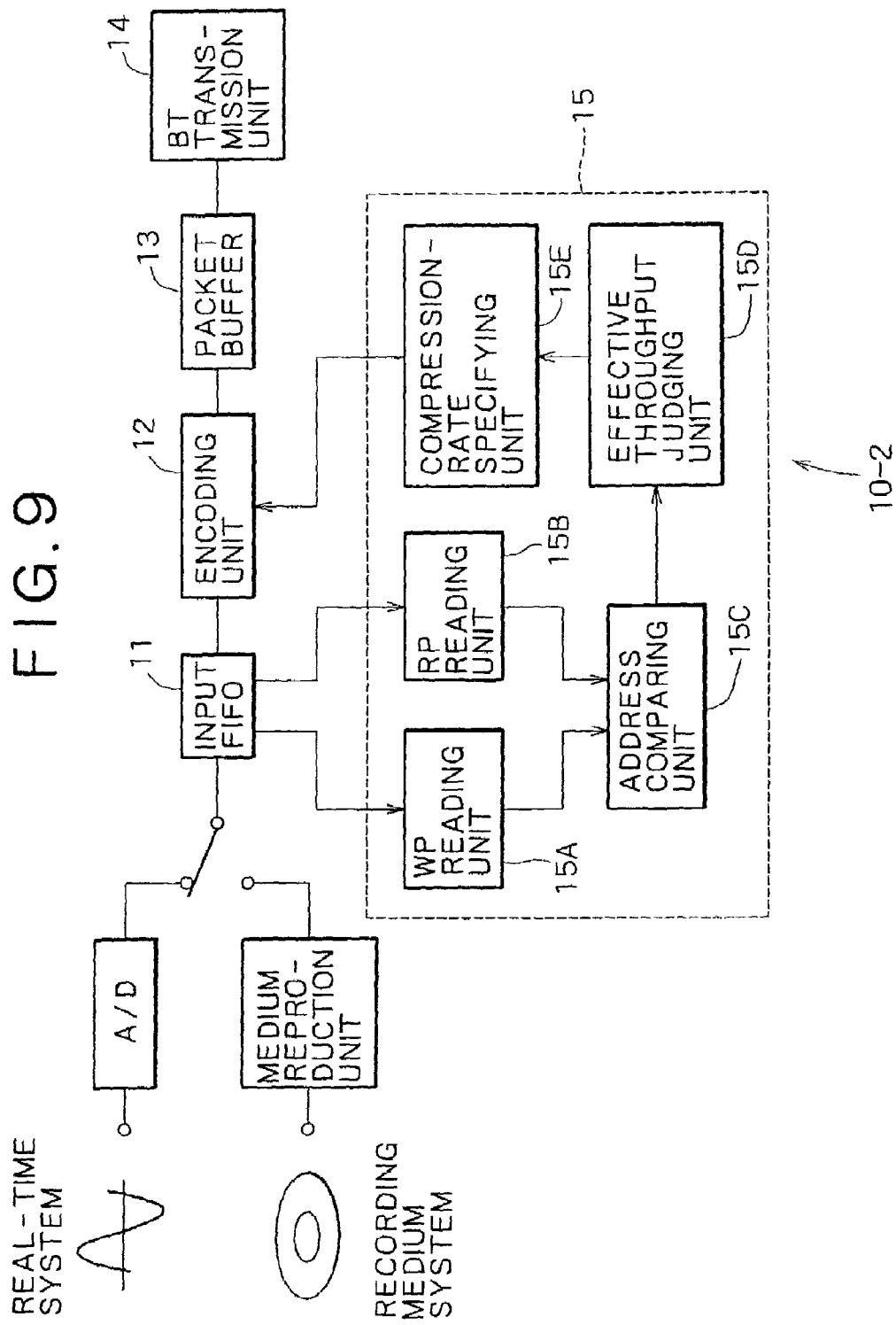
FIG. 9 is a diagram schematically illustrating another configuration example 10-2 of a radio transmission side.

FIG. 9 schematically illustrates another configuration example 10-2 of the radio transmission side. The radio transmission side 10-2 shown in FIG. 9 is based on the assumption that the effective throughput of the Bluetooth line decreases causing a situation in which only the input FIFO memory 11 is not enough to catch up with transmission of a real time signal. To be more specific, this configuration example has a mechanism for adjusting a data compression rate in the encoding unit 12 in response to a decrease in the effective throughput.

There is no means for measuring the effective throughput in the Bluetooth line directly. The example shown in FIG. 9 is so devised that the effective throughput is judged according to quantity of the accumulated data in the input FIFO memory 11. More specifically, when the quantity of the accumulated data increases, the data compression rate is increased to prevent the quantity of the accumulated data in the input FIFO memory 11 from exceeding a given value. As a result, even if the effective throughput decreases, a loss of data (sound interruption and frame dropping) can be avoided, and a size of the input FIFO memory 11 can also be reduced. To be more specific, the quantity of the accumulated data in the input FIFO memory 11 is determined by a difference between the writing pointer WP and the reading pointer RP.

As compared with the radio transmission side 10 shown in FIG. 1, the radio transmission side 10-2 shown in FIG. 9 has a configuration in which a compression-rate control unit 15 is added. This compression-rate control unit 15 comprises: a WP reading unit 15A and a RP reading unit 15B, which read addresses of the writing pointer WP and the reading pointer RP of the input FIFO memory 11 respectively; an address comparing unit 15C for comparing an address value of the WP with that of the RP; an effective throughput judging unit 15D; and a compression-rate specifying unit 15E.

The address comparing unit 15C compares pointer addresses, which are supplied from the WP reading unit 15A and the RP reading unit 15B respectively, to judge which is larger.

The effective throughput judging unit 15D judges the effective throughput of the Bluetooth line according to a difference between the address value of the writing pointer WP and the address value of the reading pointer RP.

As described above with reference to FIG. 5, because the audio signal is inputted in real time, an address of the writing pointer WP increments in proportion to time. On the other hand, an address of the reading pointer RP increments fast in a state in which the effective throughput of the Bluetooth line is high. However, if the effective throughput decreases, movement of the RP becomes slow and stops. If the time period over which the movement of the RP is slow continues long, a difference between the WP and the RP (that is to say, quantity of data accumulated in the input FIFO memory 11) gradually increases, which incurs the possibility of exceeding a size of the input FIFO memory 11.

The compression-rate specifying unit 15E specifies a data compression rate in the encoding unit 12 according to a result of the judgment by the effective throughput judging unit 15D. More specifically, by specifying a higher compression rate in response to a decrease in the effective throughput, data is read from the input FIFO memory 11 at higher speed to decrease the quantity of the accumulated data. However, the increase in the compression rate is accompanied by a trade-off, that is, degradation in data. Because of it, when the effective throughput recovers, the compression rate is gradually lowered. A range of the compression rate, which can be adjusted, is about from 64 to 400 kbps for example.

Figure 10:
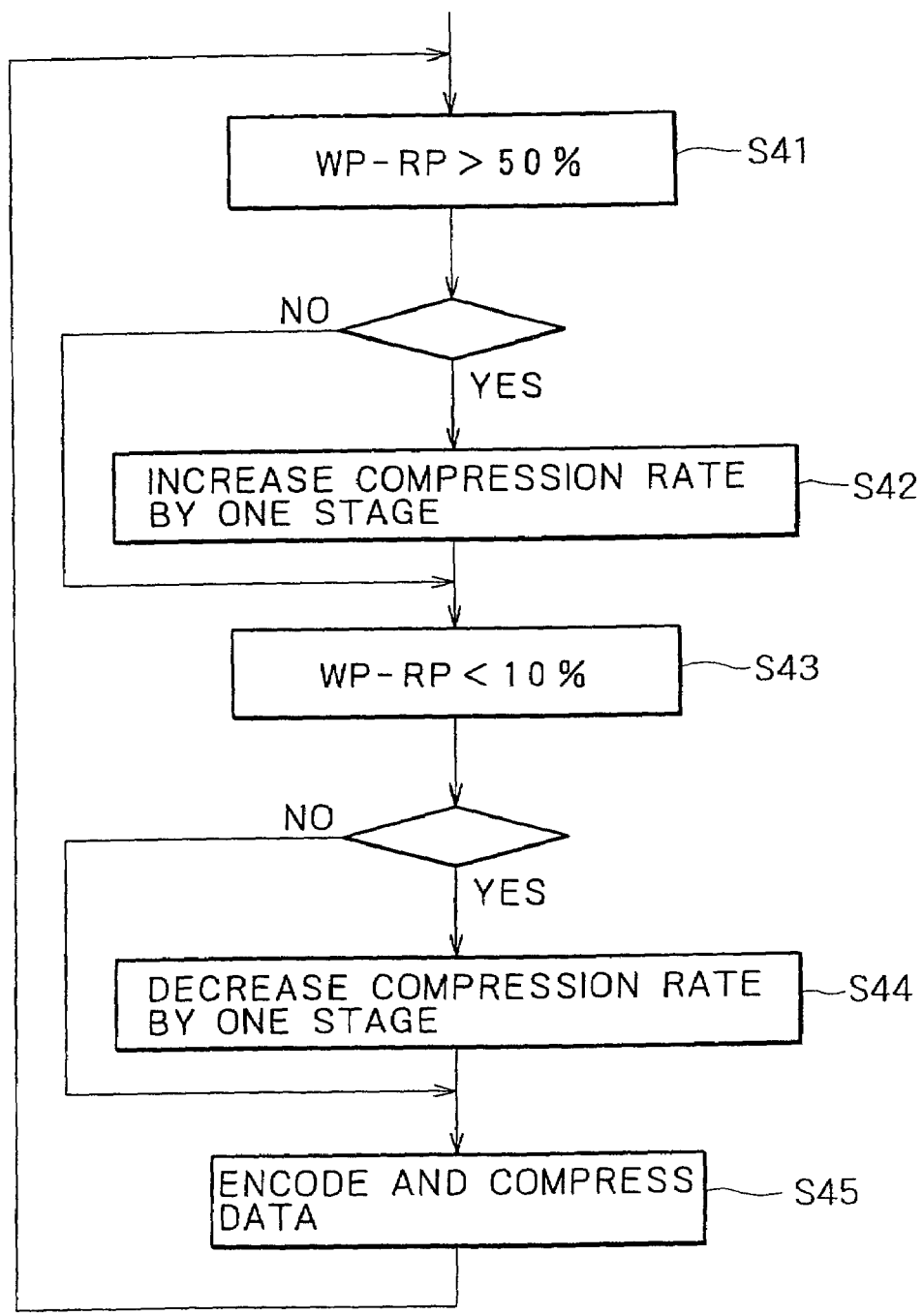
FIG. 10 is a flowchart illustrating processing procedures for controlling a data compression rate in an encoding unit 12 by a compression-rate control unit 15.

FIG. 10 illustrates processing procedures for controlling a data compression rate in the encoding unit 12 by the compression-rate control unit 15 in the form of a flowchart. Operation of the compression-rate control unit 15 will be described with reference to the flowchart as follows.

In the first place, the address comparing unit 15C compares an address value of the writing pointer WP with an address value of the reading pointer RP in the input FIFO memory 11, and checks whether or not quantity of accumulated data has exceeded 50% of a size of the input FIFO memory 11 (step S41).

If a difference between the WP and the RP exceeds 50% of the size of the input FIFO memory 11, the effective throughput judging unit 15D judges that the effective throughput of the Bluetooth line has decreased. The compression-rate specifying unit 15E increases the compression rate in the encoding unit 12 by one stage according to a result of the judgment (step S42).

However, the numerical value of 50% does not relate directly to the points of the present invention. Therefore, an appropriate threshold value can be set for controlling the compression rate as necessary.

Next, the address comparing unit 15C compares an address value of the writing pointer WP with an address value of the reading pointer RP in the input FIFO memory 11, and checks whether or not quantity of the accumulated data has become less than 10% of the size of the input FIFO memory 11 (step S43).

If a difference between the WP and the RP becomes less than 10% of the size of the input FIFO memory 11, the effective throughput judging unit 15D judges that the effective throughput of the Bluetooth line is recovering. In this case, keeping a high data compression rate causes degradation in data and a loss in line efficiency. Because of it, the compression-rate specifying unit 15E decreases the compression rate in the encoding unit 12 by one stage according to a result of the judgment (step S44). In this connection, a unit by which the compression rate is increased or decreased can be used arbitrarily.

Encoding processing is performed according to a specified compression rate, and data is transmitted through the Bluetooth line (step S45). After that, the process returns to the step S41 again, and the same processing as that described above is performed repeatedly.

By the way, as shown in FIG. 10, when data of which compression rate is variable is radio-transmitted, a mechanism for notifying the radio receiving side 20 of a compression rate of current packet data is required to decode and decompress the compressed data in the radio receiving side 20 successfully.

As a method for transmitting a compression rate parameter to the radio receiving side 20, there are a method in which a compression rate parameter is multiplexed in a data frame, a method for transmitting a compression rate parameter using another channel other than a data channel (for example, a control channel), and the like.

In this embodiment, transmission is performed in consideration of fluctuations of a network line on the radio communication side 10. Therefore, it is not necessary to judge throughput on the radio device side 20.

Figure 11:
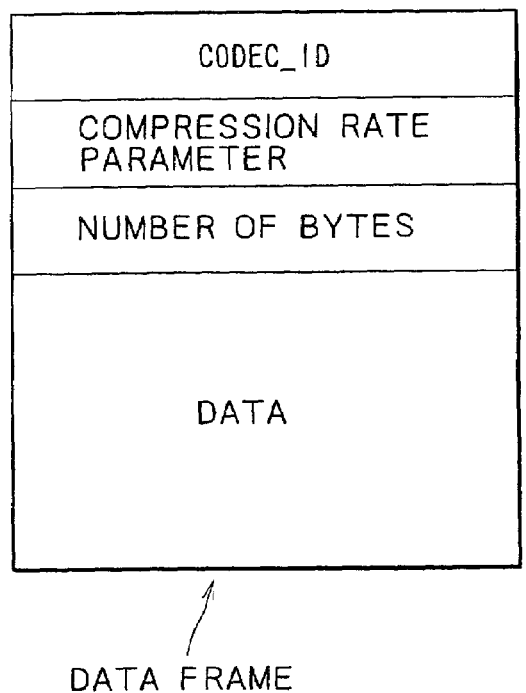
FIG. 11 is a diagram illustrating a structure of a data frame in which a compression rate parameter is multiplexed.

FIG. 11 illustrates a structure of the data frame in which the compression rate parameter is multiplexed. In the example shown in FIG. 11, Codec_ID for identifying a compression method used by the encoding unit 12, a compression rate parameter, and a number of bytes are written to a header added to the data frame. As a matter of course, other control information may be included in the header.

Figure 12:
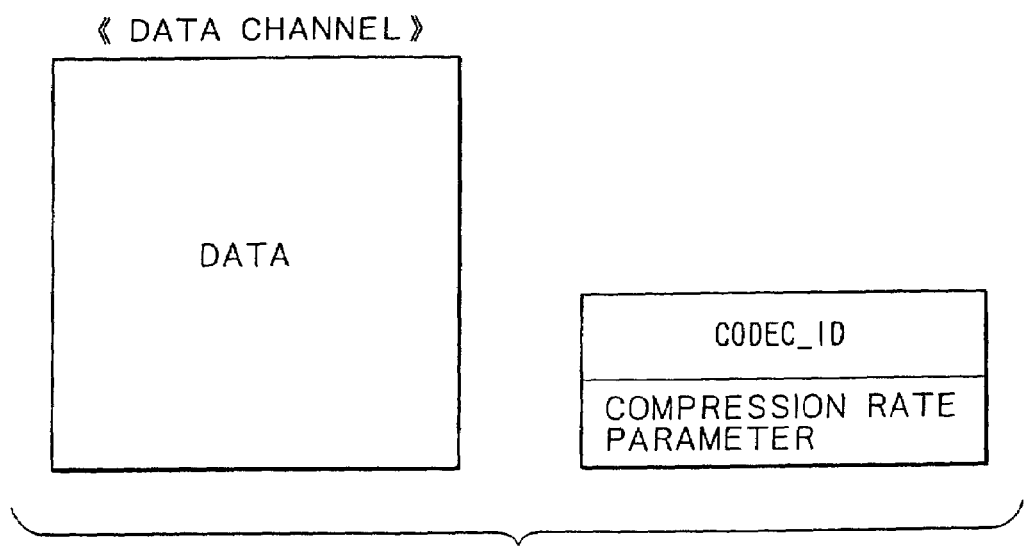
FIG. 12 is a diagram illustrating a method for transmitting a compression rate parameter using another channel other than a data channel (for example, a control channel).

In addition, FIG. 12 illustrates a case where the compression rate parameter is transmitted using another channel other than the data channel (for example, the control channel). As shown in FIG. 12, the Codec_ID for identifying a compression method, which has been used by the encoding unit 12, and the compression rate parameter are written to data transmitted by the control channel, which is provided separately from the data channel for transmitting the data frame.

Processing operation of the writing pointer WP and the reading pointer RP in the input FIFO memory 11 of the radio transmission side 10-2 shown in FIG. 9 is basically similar to processing procedures described above with reference to FIGS. 3 and 4. However, as a different point, processing for transmitting the compression rate parameter used in the step S13 to the radio receiving side 20 is added.

For example, as shown in FIG. 11, if the compression rate parameter is multiplexed in the data frame, the compression rate parameter is inserted in the header portion when writing the data to the packet buffer 13 in the step S14 (that is to say, when generating a transmission packet).

Moreover, as shown in FIG. 12, if the compression rate parameter is transmitted using the control channel other than the data channel, a processing step for inserting the compression rate parameter used in the step S13 in the frame for the control channel, which is not shown in the figure, may be added.

Figure 23:
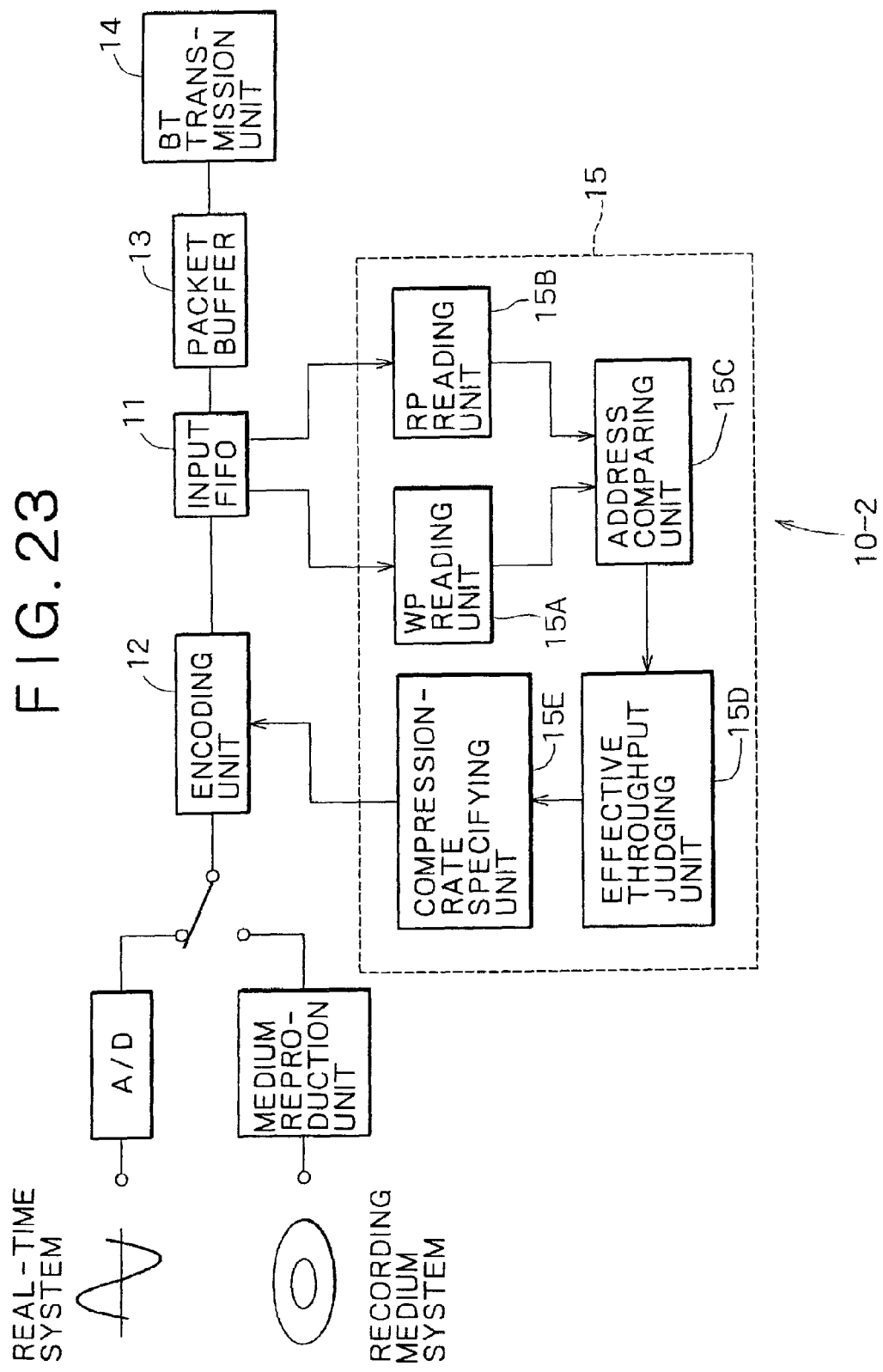
FIG. 23 is a diagram illustrating an irregular example 10-2' of the radio transmission side 10-2 shown in FIG. 9.

FIG. 23 schematically illustrates an irregular example 10-2' of the radio transmission side 10-2 shown in FIG. 9. As is the case with the configuration example 10-2 shown in FIG. 9, the radio transmission side 10-2' shown in FIG. 23 has a configuration in which a compression-rate control unit 15 for adjusting a data compression rate in the encoding unit 12 in response to a decrease in effective throughput is added.

This compression-rate control unit 15 comprises: a WP reading unit 15A and a RP reading unit 15B, which read addresses of the writing pointer WP and the reading pointer RP of the input FIFO memory 11 respectively, an address comparing unit 15C for comparing an address value of the WP with that of the RP, an effective throughput judging unit 15D, and a compression-rate specifying unit 15E.

The address comparing unit 15C compares pointer addresses, which are supplied from the WP reading unit 15A and the RP reading unit 15B respectively, to judge which is larger. The effective throughput judging unit 15D judges the effective throughput of the Bluetooth line according to a difference between the address value of the writing pointer WP and the address value of the reading pointer RP. The compression-rate specifying unit 15E specifies a data compression rate in the encoding unit 12 according to a result of the judgment by the effective throughput judging unit 15D. More specifically, by specifying a higher compression rate in response to a decrease in the effective throughput, data is read from the input FIFO memory 11 at higher speed to decrease the quantity of the accumulated data. In addition, when the effective throughput recovers, the compression rate is gradually lowered. A range of the compression rate, which can be adjusted, is about from 64 to 400 kbps for example.

A point of difference between FIG. 23 and FIG. 9 is that in the case of the former radio transmission side 10-2', the encoding unit 12 is placed before the input FIFO memory 11. According to such a configuration, only compressed data is accumulated in the input FIFO memory 11. Because of it, as compared with the case of FIG. 9 where data before compression is accumulated, the memory size can be reduced significantly.

Figure 13:
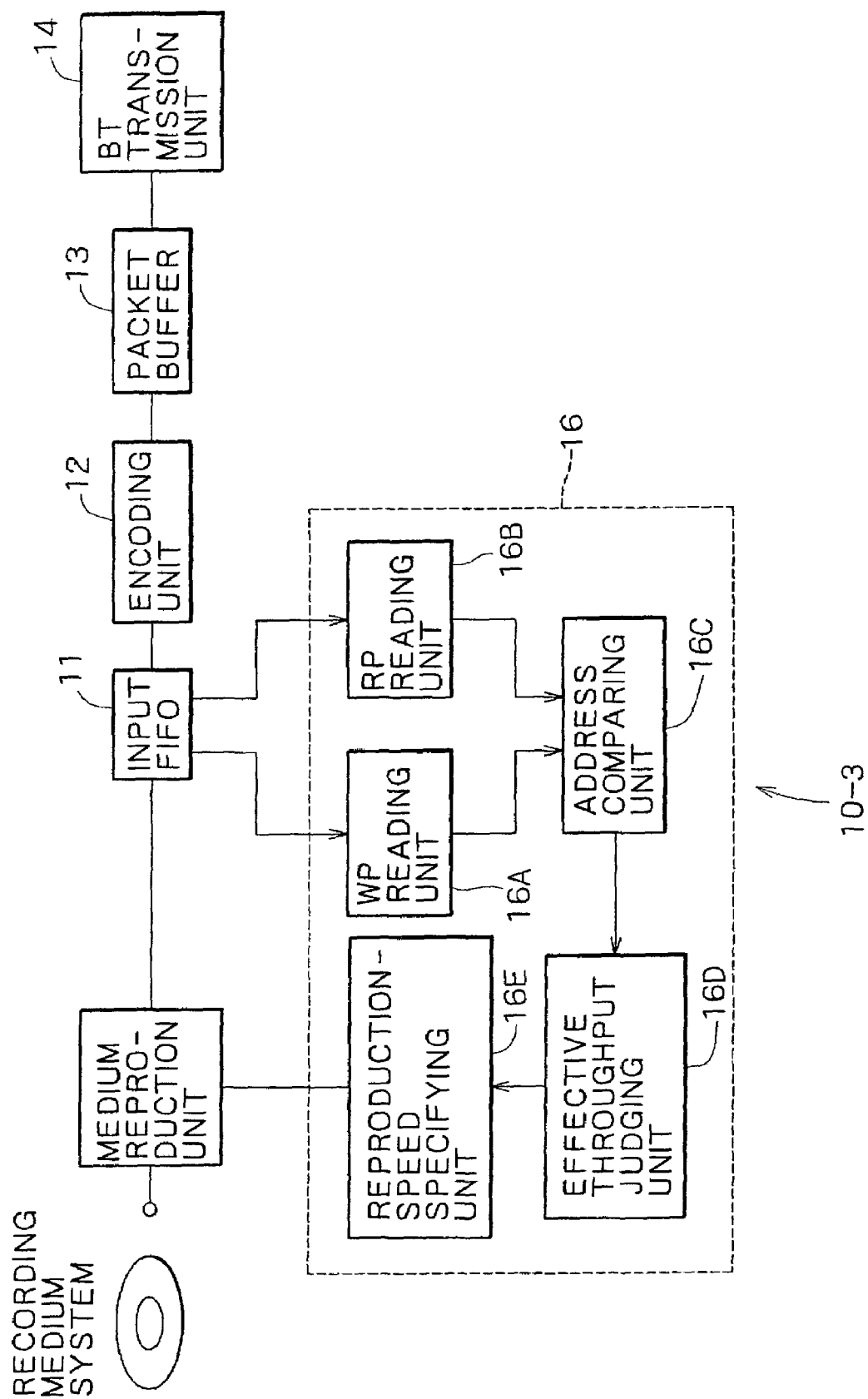
FIG. 13 is a diagram schematically illustrating another configuration example 10-3 of a radio transmission side.

FIG. 13 schematically illustrates another configuration example 10-3 of the radio transmission side. The radio transmission side 10-3 shown in FIG. 13 is one type of a device, which transmits not a real-time audio signal but an audio signal reproduced from a recording medium such as CD. This radio transmission side 10-3 is based on the assumption that the effective throughput of the Bluetooth line decreases causing a situation in which only the input FIFO memory 11 is not enough to catch up with transmission of a real time signal. This configuration example has a mechanism for adjusting data reproduction speed in a media reproduction unit in response to a decrease in the effective throughput.

There is no means for measuring the effective throughput in the Bluetooth line directly. The example shown in FIG. 13 is so devised that the effective throughput is judged according to quantity of the accumulated data in the input FIFO memory 11. More specifically, when the quantity of the accumulated data increases, the data compression rate is increased to prevent the quantity of the accumulated data in the input FIFO memory 11 from exceeding a given value. As a result, even if the effective throughput decreases, a loss of data (sound interruption and frame dropping) can be avoided, and a size of the input FIFO memory 11 can also be reduced. To be more specific, the quantity of the accumulated data in the input FIFO memory 11 is determined by a difference between the writing pointer WP and the reading pointer.

As compared with the radio transmission side 10 shown in FIG. 1, the radio transmission side 10-3 shown in FIG. 13 has a configuration in which a reproduction-speed control unit 16 is added. This reproduction-speed control unit 16 comprises: a WP reading unit 16A and a RP reading unit 16B, which read addresses of the writing pointer WP and the reading pointer RP of the input FIFO memory 11 respectively; an address comparing unit 16C for comparing an address value of the WP with that of the RP; an effective throughput judging unit 16D; and a reproduction-speed specifying unit 16E. However, the WP reading unit 16A, the RP reading unit 16B, the address comparing unit 16C, and the effective throughput judging unit 16D can be shared with the radio transmission side 10-2 shown in FIG. 9.

The address comparing unit 16C compares pointer addresses, which are supplied from the WP reading unit 16A and the RP reading unit 16B respectively, to judge which is larger.

The effective throughput judging unit 16D judges the effective throughput of the Bluetooth line according to a difference between the address value of the writing pointer WP and the address value of the reading pointer RP.

As described above with reference to FIG. 5, because the audio signal is inputted in real time, an address of the writing pointer WP increments in proportion to time. On the other hand, an address of the reading pointer RP increments fast in a state in which the effective throughput of the Bluetooth line is high. However, if the effective throughput decreases, movement of the RP becomes slow and stops. If the time period over which the movement of the RP is slow continues long, a difference between the WP and the RP (that is to say, quantity of data accumulated in the input FIFO memory 11) gradually increases, which incurs the possibility of exceeding a size of the input FIFO memory 11.

The reproduction-speed specifying unit 16E specifies data reproduction speed, which is used when reproducing a recording medium, in the media reproduction unit according to a result of the judgment by the effective throughput judging unit 16D. More specifically, by specifying lower reproduction speed in response to a decrease in the effective throughput, data is written to the input FIFO memory 11 at lower speed to decrease the quantity of the accumulated data. However, the decrease in reproduction speed is accompanied by a trade-off (that is, a decrease in read-ahead data from the recording medium), which causes sound skipping (or frame dropping). Therefore, when the effective throughput recovers, it is desirable to increase the data reproduction speed gradually.

Figure 14:
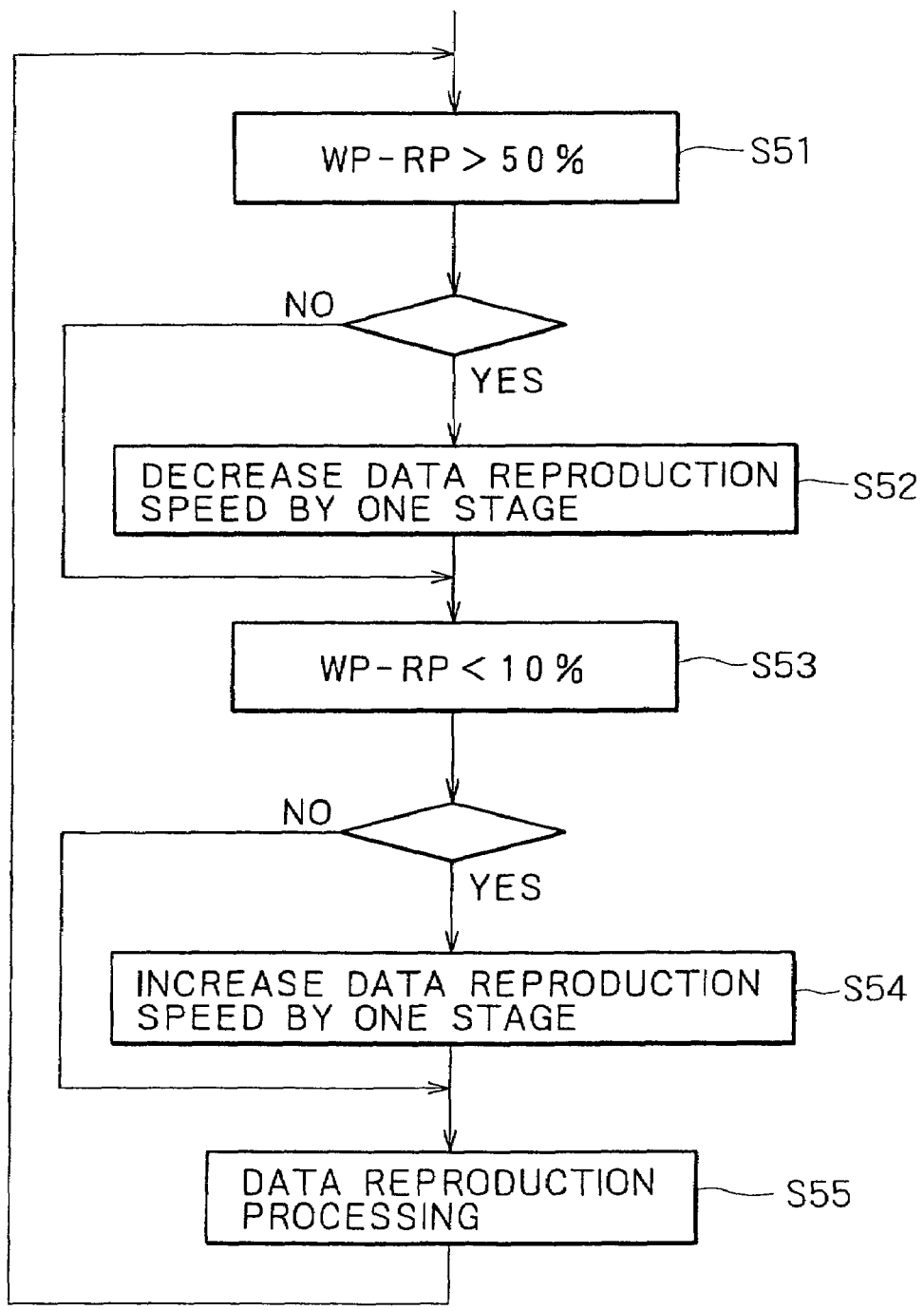
FIG. 14 is a flowchart illustrating processing procedures for controlling data reproduction speed, which is used when reproducing a recording medium, in a medium reproduction unit by a reproduction-speed control unit 16.

FIG. 14 illustrates processing procedures for controlling data reproduction speed, which is used when reproducing the recording medium, in the media reproduction unit by the reproduction-speed control unit 16 in the form of a flowchart. Operation of the reproduction-speed control unit 16 will be described with reference to the flowchart as follows.

In the first place, the address comparing unit 16C compares an address value of the writing pointer WP with an address value of the reading pointer RP in the input FIFO memory 11, and checks whether or not quantity of accumulated data has exceeded 50% of a size of the input FIFO memory 11 (step S51).

If a difference between the WP and the RP exceeds 50% of the size of the input FIFO memory 11, the effective throughput judging unit 16D judges that the effective throughput of the Bluetooth line has decreased. The reproduction-speed specifying unit 16E decreases the data reproduction speed in the media reproduction unit by one stage according to a result of the judgment (step S52).

However, the numerical value of 50% does not relate directly to the points of the present invention. Therefore, an appropriate threshold value can be set as necessary.

Next, the address comparing unit 16C compares an address value of the writing pointer WP with an address value of the reading pointer RP in the input FIFO memory 11, and checks whether or not quantity of the accumulated data has become less than 10% of the size of the input FIFO memory 11 (step S53).

If a difference between the WP and the RP becomes less than 10% of the size of the input FIFO memory 11, the effective throughput judging unit 16D judges that the effective throughput of the Bluetooth line is recovering. In this case, keeping a high data compression rate causes degradation in data and a loss in line efficiency. Because of it, the reproduction-speed specifying unit 16E increases the data reproduction speed in the media reproduction unit by one stage according to a result of the judgment (step S54). In this connection, a unit by which the data reproduction speed is increased or decreased can be used arbitrarily.

Data reproduction from the recording medium is performed according to a specified data reproduction speed, and data is transmitted through the Bluetooth line (step S55). After that, the process returns to the step S51 again, and the same processing as that described above is performed repeatedly.

Processing operation of the writing pointer WP and the reading pointer RP in the input FIFO memory 11 of the radio transmission side 10-3 shown in FIG. 13 is basically similar to processing procedures described above with reference to FIGS. 3 and 4. However, as opposed to a case where an audio signal inputted in a real time system is handled, data is not always supplied in constant quantity at every given sampling cycle. An address of the writing pointer WP of the input FIFO memory 11, therefore, does not always increment in proportion to time.

Figure 15:
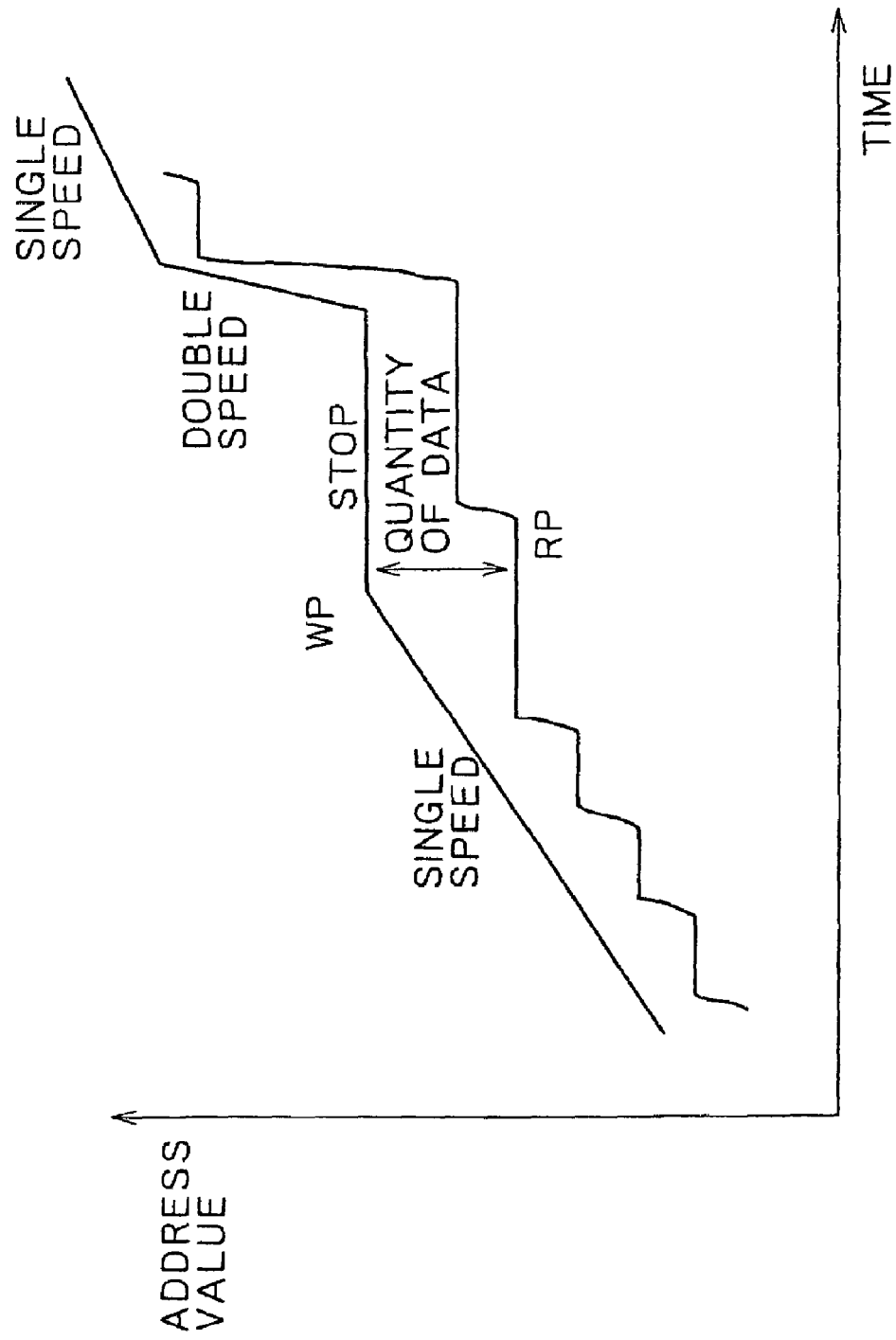
FIG. 15 is a diagram illustrating how a writing pointer WP and a reading pointer RP in an input FIFO memory 11 of a radio transmission side 10-3 change.

FIG. 15 illustrates how the writing pointer WP and the reading pointer RP in the input FIFO memory 11 of the radio transmission side 10-3 change. However, in the illustrated example, it is assumed that medium reproduction speed is switched to single speed, double speed, and stop in stages for convenience of explanation.

As shown in FIG. 15, a difference between the writing pointer WP and the reading pointer RP becomes small as compared with the case shown in FIG. 5. This avoids a situation in which sound skipping (frame dropping), or the like, caused by a mistake in writing reproduced data occurs. In addition to it, this can reduce a size of the input FIFO memory 11 furthermore.

By the way, in the explanation as above, each of the two examples shown in FIGS. 9 and 13 is individually introduced as a modified example of the radio transmission side 10. However, the radio transmission device may be configured to be equipped with both of the compression-rate control unit 15 and the reproduction-speed control unit 16. In such a case, it is possible to respond to a change in the effective throughput in the Bluetooth line by adjusting both of the data compression rate and the data reproduction speed. In addition, the device configuration can also be simplified by sharing the WP reading unit, the RP reading unit, the address comparing unit, and the effective throughput judging unit between the compression-rate control unit 15 and the reproduction-speed control unit 16.

Figure 16:
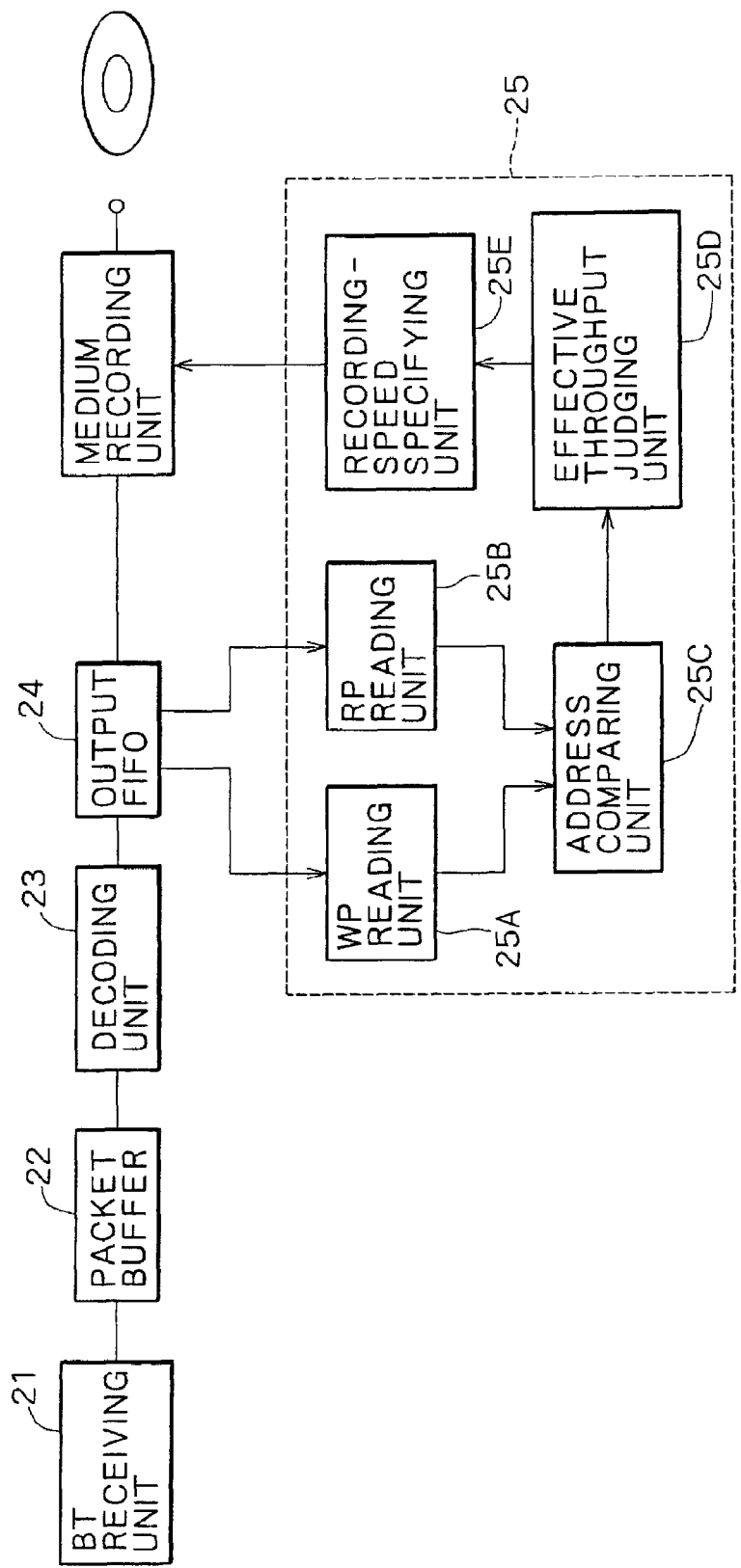
FIG. 16 is a diagram schematically illustrating another configuration example 20-2 of a radio receiving side.

FIG. 16 schematically illustrates another configuration example 20-2 of the radio receiving side. The radio receiving side 20-2 shown in FIG. 16 is one type of a device that does not output a real-time audio signal but records an audio signal in a recording medium such as MD and CD-R. The radio receiving side 20-2 is based on the assumption that the effective throughput of the Bluetooth line decreases causing a situation in which only the output FIFO memory 24 is not enough to catch up with data receiving for data recording operation. This configuration example has a mechanism for adjusting data recording speed in a media recording unit in response to a decrease in the effective throughput.

There is no means for measuring the effective throughput in the Bluetooth line directly. The example shown in FIG. 16 is so devised that the effective throughput is judged according to quantity of the accumulated data in the output FIFO memory 24. More specifically, when the quantity of the accumulated data increases, the data recording speed is increased to prevent the quantity of the accumulated data in the output FIFO memory 24 from exceeding a given value. As a result, even if the effective throughput decreases, a loss of data can be avoided, and a size of the output FIFO memory 24 can also be reduced. The quantity of the accumulated data in the output FIFO memory 24 (more specifically, throughput) is determined by a difference between the writing pointer WP and the reading pointer. If the radio receiving side 20-2 has a function of recording received data in a medium, recording speed should be controlled in response to fluctuations of a network line connected to the radio transmission side 10. Therefore, judgment of throughput is required.

As compared with the radio receiving side 20 shown in FIG. 1, the radio receiving side 20-2 shown in FIG. 16 has a configuration in which a recording-speed control unit 25 is added. This recording-speed control unit 25 comprises: a WP reading unit 25A and a RP reading unit 25B, which read addresses of the writing pointer WP and the reading pointer RP of the output FIFO memory 24 respectively; an address comparing unit 25C for comparing an address value of the WP with that of the RP; an effective throughput judging unit 25D; and a recording-speed specifying unit 25E.

The address comparing unit 25C compares pointer addresses, which are supplied from the WP reading unit 25A and the RP reading unit 25B respectively, to judge which is larger.

The effective throughput judging unit 25D judges the effective throughput of the Bluetooth line according to a difference between the address value of the writing pointer WP and the address value of the reading pointer RP.

The recording-speed specifying unit 25E specifies data recording speed, which is used when recording data in a recording medium, in the media recording unit according to a result of the judgment by the effective throughput judging unit 25D. More specifically, by specifying a higher recording speed in response to a recoverly in the effective throughput, data is read from the output FIFO memory 11 at higher speed to decrease the quantity of the accumulated data.

Figure 17:
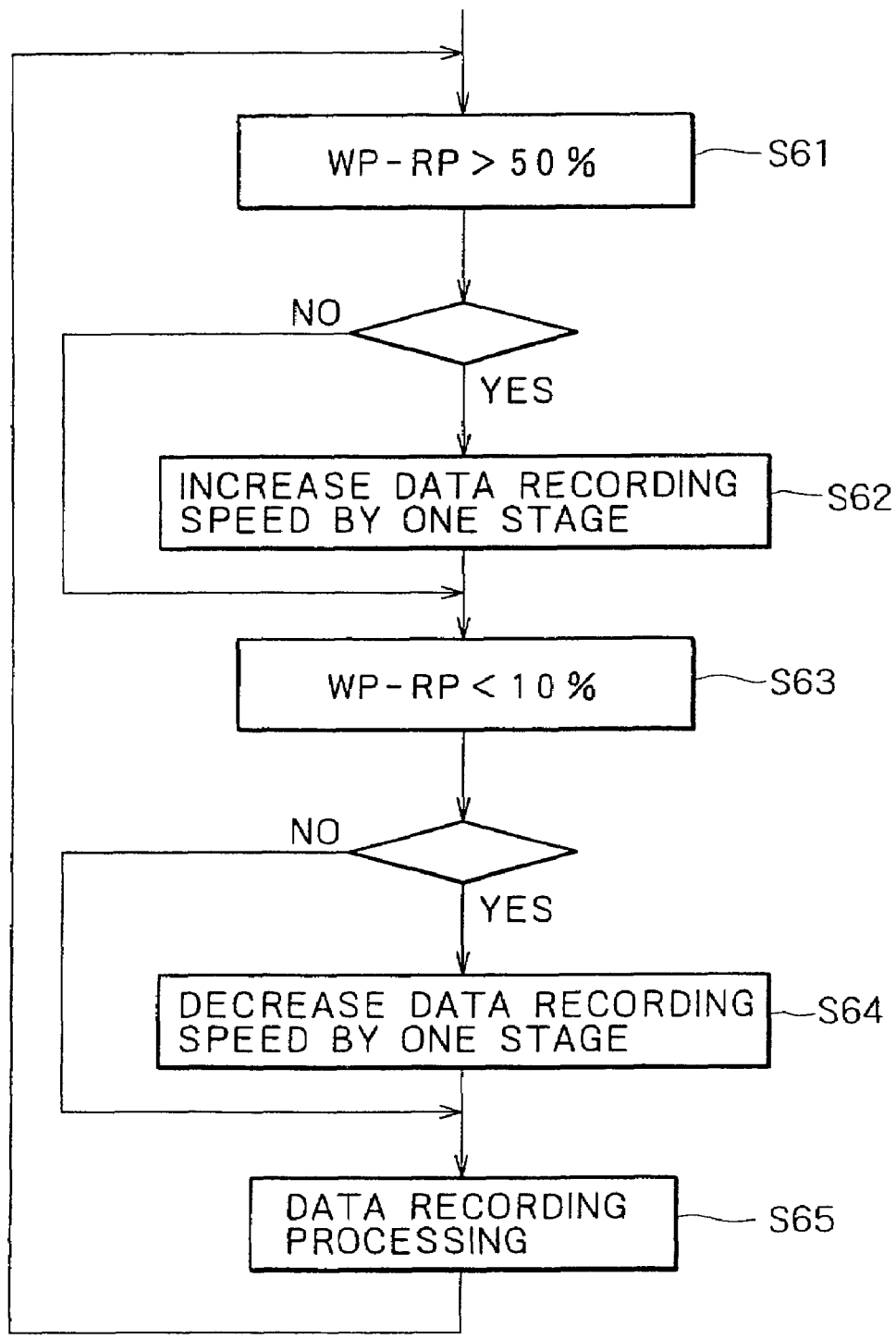
FIG. 17 is a flowchart illustrating processing procedures for controlling data recording speed, which is used when recording in a recording medium, in a medium recording unit by a recording-speed control unit 25.

FIG. 17 illustrates processing procedures for controlling data recording speed, which are used when recording in the recording medium, in the media recording unit by the recording-speed control unit 25 in the form of a flowchart. Operation of the recording-speed control unit 25 will be described with reference to the flowchart as follows.

In the first place, the address comparing unit 25C compares an address value of the writing pointer WP with an address value of the reading pointer RP in the output FIFO memory 24, and checks whether or not quantity of accumulated data has exceeded 50% of a size of the output FIFO memory 24 (step S61).

If a difference between the WP and the RP exceeds 50% of the size of the output FIFO memory 11, the effective throughput judging unit 25D judges that the effective throughput of the Bluetooth line has improved. The recording-speed specifying unit 25E increases the data recording speed in the media recording unit by one stage according to a result of the judgment (step S62).

However, the numerical value of 50% does not relate directly to the points of the present invention. Therefore, an appropriate threshold value can be set as necessary.

Next, the address comparing unit 25C compares an address value of the writing pointer WP with an address value of the reading pointer RP in the output FIFO memory 24, and checks whether or not quantity of the accumulated data has become less than 10% of the size of the output FIFO memory 24 (step S63).

If a difference between the WP and the RP becomes less than 10% of the size of the output FIFO memory 24, the effective throughput judging unit 25D judges that the effective throughput of the Bluetooth line is decreasing. In such a case, it is meaningless to keep high data recording. Because of it, the recording-speed specifying unit 25E decreases the data recording speed in the media recording unit by one stage according to a result of the judgment (step S64). In this connection, a unit by which the data recording speed is increased or decreased can be used arbitrarily.

Data is written to the recording medium according to a specified data recording speed (step S65). After that, the process returns to the step S61 again, and the same processing as that described above is performed repeatedly.

Processing operation of the writing pointer WP and the reading pointer RP in the output FIFO memory 24 of the radio receiving side 20-2 shown in FIG. 16 is basically similar to processing procedures described above with reference to FIGS. 6 and 7. However, as opposed to a case where an audio signal inputted in a real time system is handled, data is not always read in constant quantity at every given sampling cycle. An address of the reading pointer RP of the output FIFO memory 25, therefore, does not always increment in proportion to time.

Figure 18:
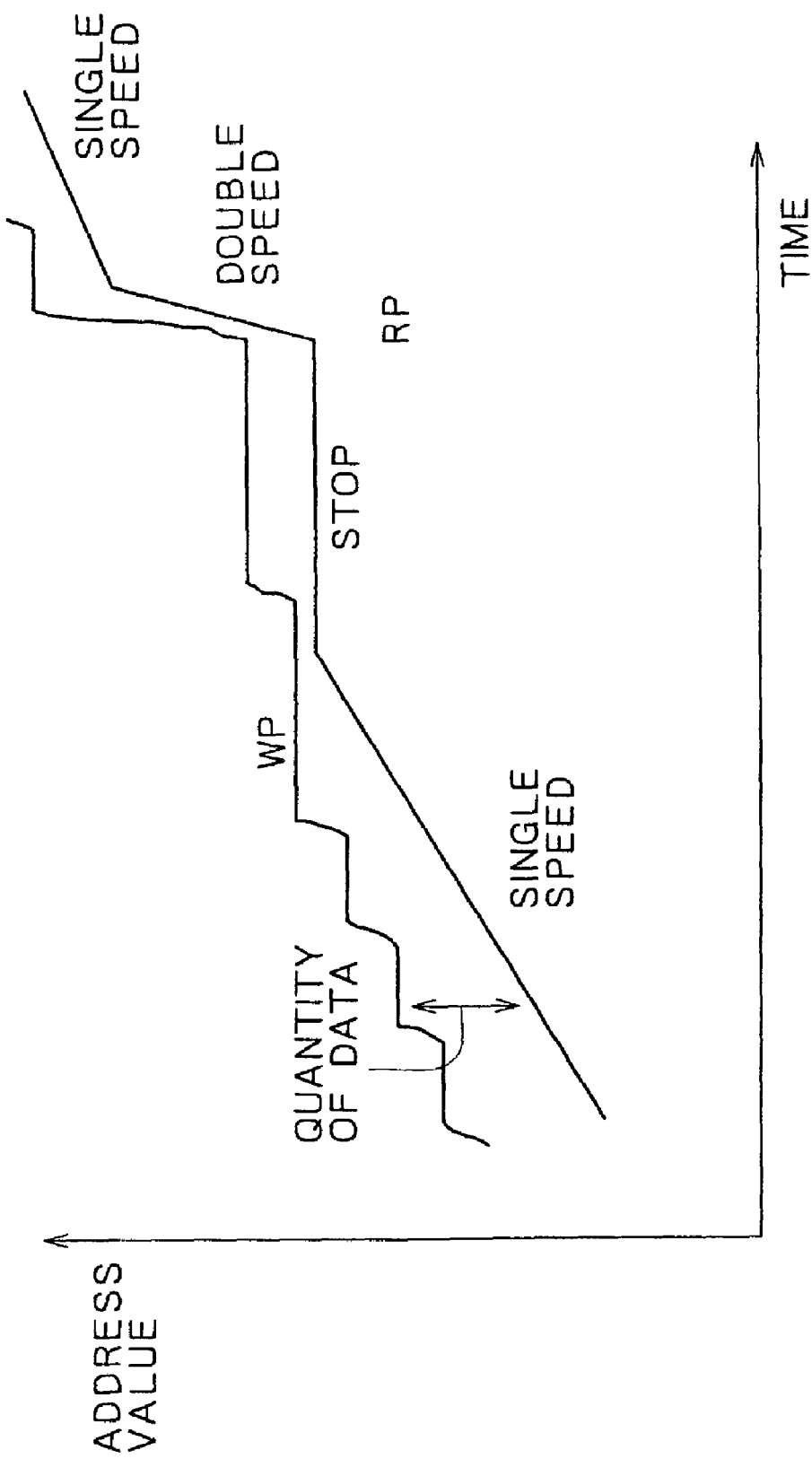
FIG. 18 is a diagram illustrating how a writing pointer WP and a reading pointer RP in an output FIFO memory 24 of a radio receiving side 20-2 change.

FIG. 18 illustrates how the writing pointer WP and the reading pointer RP in the output FIFO memory 24 of the radio receiving side 20-2 change. However, in the illustrated example, it is assumed that medium recording speed is switched to single speed, double speed, and stop in stages for convenience of explanation.

As shown in FIG. 18, a difference between the writing pointer WP and the reading pointer RP becomes small as compared with the case shown in FIG. 8. This avoids a situation in which a mistake in recording received data, or the like, occurs. In addition to it, this can reduce a size of the output FIFO memory 24 furthermore.

Figure 19:
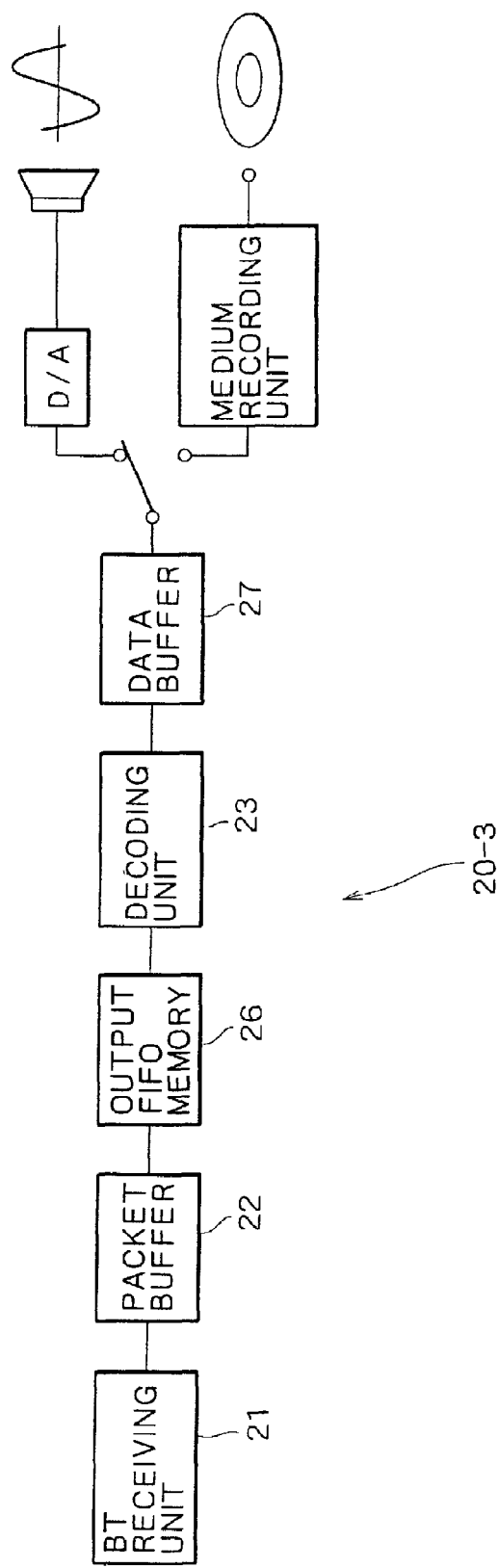
FIG. 19 is a diagram schematically illustrating another configuration example 20-3 of a radio receiving side.

FIG. 19 schematically illustrates another configuration example 20-3 of the radio receiving side. The radio receiving side 20-3 shown in FIG. 19 is different from the radio receiving side 20 shown in FIG. 1. In the radio receiving side 20-3, an output FIFO memory 26 is placed in a position before a decoding unit 23. According to such a configuration, only compressed data is accumulated in the output FIFO memory 26. Because of it, as compared with the case of FIG. 1 where data after decoding is accumulated, the memory size can be reduced significantly. In the case of such a configuration, it is necessary to place a data buffer 27 additionally after the decoding unit 23. However, although a size of the data buffer 27 should be taken into consideration in addition to the output FIFO memory 26, it is possible to make its total memory size lower than that of the output FIFO memory 24 shown in FIG. 1.

Figure 20:
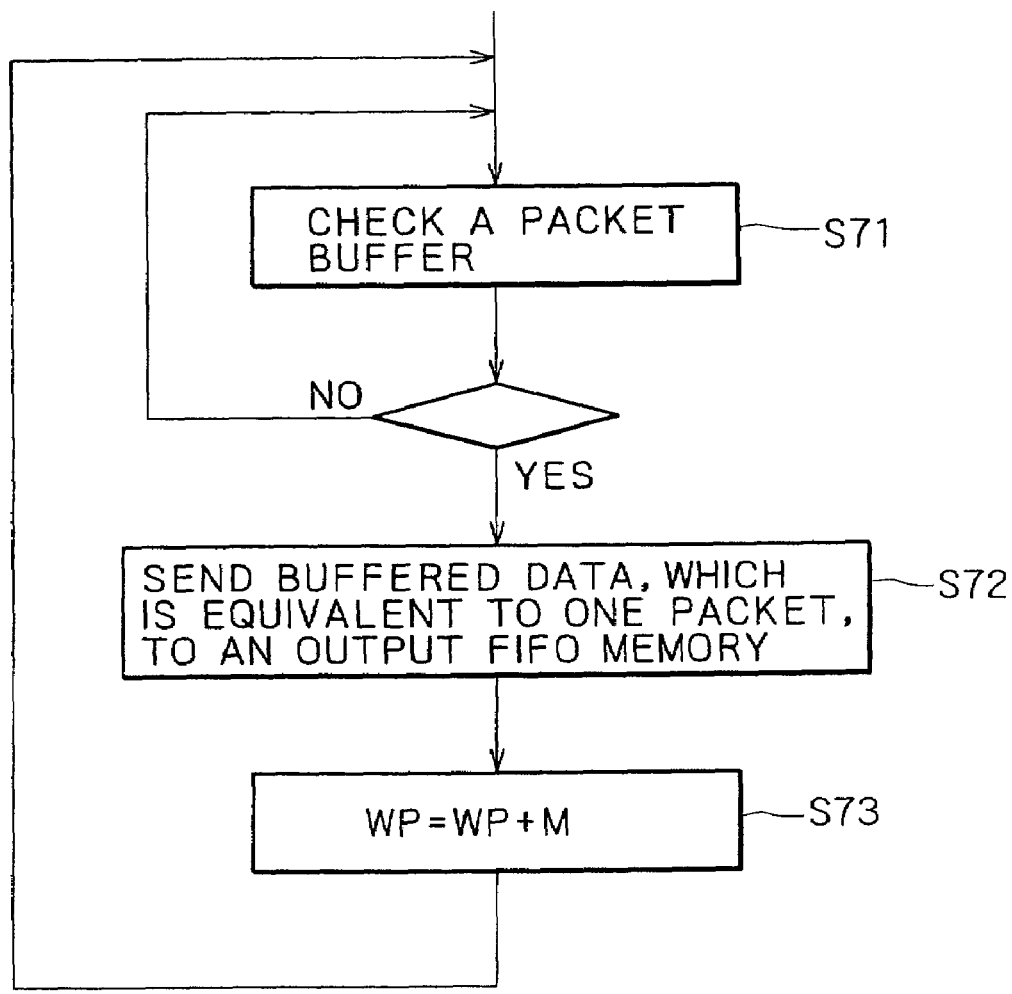
FIG. 20 is a flowchart illustrating processing procedures for controlling a writing pointer WP of an output FIFO memory 26 on a radio receiving side 20-3.
Figure 21:
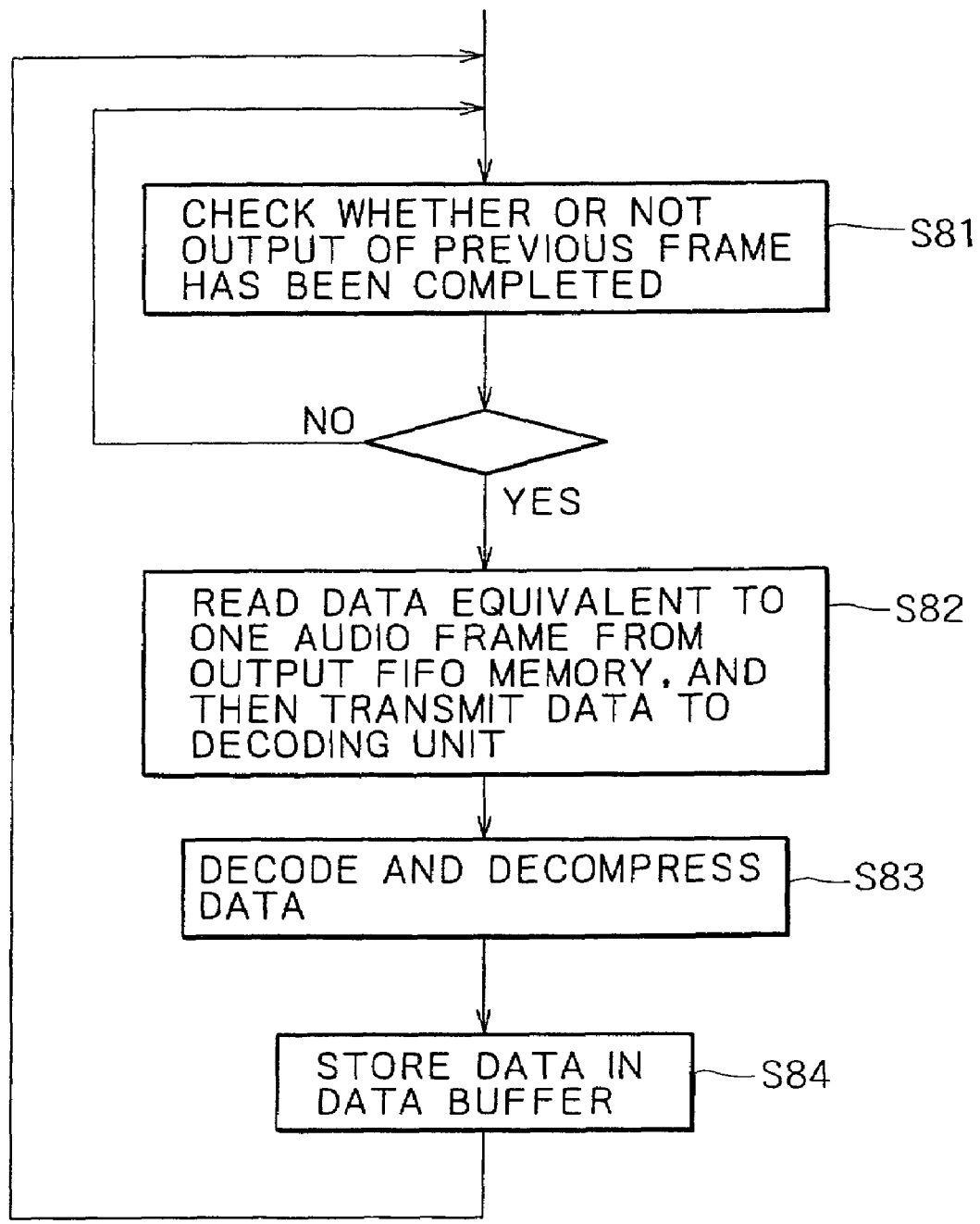
FIG. 21 is a flowchart illustrating processing procedures for controlling a reading pointer RP of an input FIFO memory 26 on a radio receiving side 20-3.

FIG. 20 illustrates processing procedures for controlling a writing pointer WP of the output FIFO memory 26 in the form of a flowchart. In addition, FIG. 21 illustrates processing procedures for controlling a reading pointer RP of the output FIFO memory 26 in the form of a flowchart. Operation characteristics of the output FIFO memory 26 will be described with reference to FIGS. 20 and 21 as follows.

Whether or not the packet buffer 22 is full is checked on the input side of the output FIFO memory 26 (step S71). Whether or not the packet buffer 22 is full depends on the effective throughput of the Bluetooth line.

If the packet buffer 22 is full, a data frame, which is equivalent to one buffered packet, is transmitted and written to the output FIFO memory 26 (step S72). In addition to it, an address value of the writing pointer WP is incremented by M that is equivalent to the written data frame (step S73). After that, the process returns to the step S71, and the same processing as that described above is performed repeatedly.

On the other hand, on the output side of the output FIFO memory 26, whether or not an output of the previous frame (for example, audio output, and recording in a recording medium) has been completed is checked (step S81).

If the output of the previous frame has been completed, data equivalent to one audio frame is read from the output FIFO memory 26, and then transmitted to the decoding unit 23 in the subsequent stage (step S82), where the data is decoded and decompressed (step S83).

The decoded frame is temporarily stored in the data buffer in the subsequent stage (step S84).

An address value of the reading pointer RP of the output FIFO memory 26 is incremented by a value equivalent to the read data. Then, the process returns to the step S81, and the same processing as that described above is performed repeatedly.

If decoded data is audio output, data equivalent to one sample is read from the data buffer 27 at every sampling cycle, and is transmitted to the D/A converter.

FIGS. 22A through 22D illustrate operation, which is accompanied by a change in the effective throughput in the radio transmitting/receiving system 1 according to this embodiment, in the form of a time chart.

Figure 22:
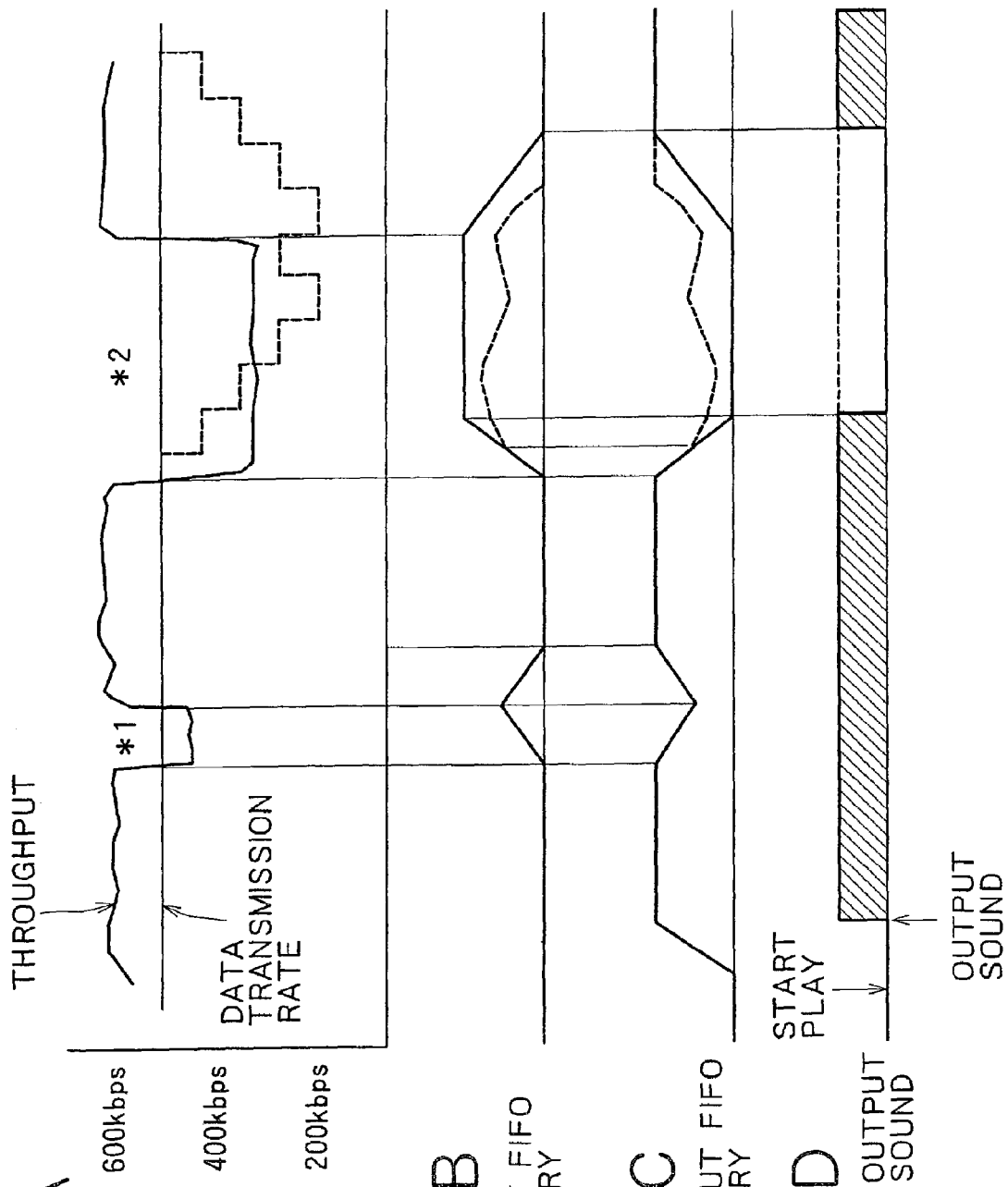
FIGS. 22A through 22D are time charts illustrating operation, which is accompanied by a change in effective throughput in a radio transmitting/receiving system 1 according to this embodiment.

FIG. 22A illustrates a change in the Bluetooth line by means of modeling. FIG. 22A exemplifies a case where a signal is transmitted at 500 kbps. In this figure, it is assumed that comparatively light degradation of line quality occurs at the timing shown by *1, and that comparatively heavy degradation of line quality occurs at the timing shown by *2. In this connection, it is also assumed that sound is not output in the radio receiving side 20 for 0.5 seconds after sound source reproduction is started in the radio transmission side 10, and that only data accumulation to the output FIFO memory 24 is performed.

FIGS. 22B, 22C, and 22D indicate quantity of accumulated data in the input FIFO memory 11 of the radio transmission side 10, quantity of accumulated data in the output FIFO memory 24 of the radio receiving side 20, and transition with time between on/off of output sound respectively.

Output sound is not output for 0.5 seconds after sound source reproduction is started on the radio transmission side 10. Data is accumulated in the buffer, that is to say, in the output FIFO buffer memory 24. To be more specific, a transmission memory is empty in a steady state. On the other hand, a receiving memory is full.

At the timing shown by *1, as a result that comparatively light degradation of line quality occurred, shortage of throughput is accumulated in the input FIFO memory 11 as the transmission memory on the radio transmission side 10. On the other hand, on the radio receiving side 20, the output sound is reproduced without interruption by supplementing with the data accumulated in the output FIFO memory 24 as the receiving memory.

In addition, at the timing shown by *2, as a result that comparatively heavy degradation of line quality occurs, the input FIFO memory 11 overflows in an example of the radio transmission side 10. After the output FIFO memory 24 on the radio receiving side 20 becomes empty, sound interruption occurs.

In FIGS. 22A through 22D, a part indicated by a broken line within a timing period indicated by *2 shows operation characteristics obtained when the compression-rate control unit 15 operates.

In this case, it is so devised that data compression rate in the encoding unit 12 is increased in stages (that is to say, data rate is decreased) every time quantity of accumulated data in the input FIFO memory 11 exceeds 50% of a memory size on the radio transmission side 10. Moreover, it is also so devised that data compression rate is decreased in stages every time quantity of the accumulated data in the input FIFO memory 11 becomes lower than 10% of the memory size.

It is to be noted that the compression rate may be switched, for example, at every frame cycle of encoding processing. However, how to switch the compression rate is not limited to this. Switching of the compression rate may be controlled adaptively at arbitrary time intervals.

By changing the data compression rate dynamically according to a change in the effective throughput using the compression-rate control unit 15 (refer to FIG. 10), the data rate can be decreased before the input FIFO memory 11 overflows as shown in FIG. 22B. As a result, as shown in FIG. 22C, the situation in which the output FIFO memory 25 becomes empty is avoided. In addition to it, as shown in FIG. 22D, the interruption of output sound can also be avoided.

In addition, it is possible to use the highest data rate in response to effective throughput through operation of the compression-rate control unit 15. Therefore, data transmission of high sound quality can be achieved.

It is desirable that the input FIFO memory 11 is placed in a position before the encoding unit 12. That is because switching of data compression rate can be reflected immediately. In contrast to this, as described above with reference to FIG. 16, the output FIFO memory 24 can be placed before or behind the decoding unit 23. A size of the output FIFO memory 24 can be saved by placing the output FIFO memory 24 before the decoding unit 23.

If an input signal source is provided not by a real time system but a recording medium system, and if variable speed reproduction is possible, a size of the input FIFO memory 11 can be reduced, or the input FIFO memory 11 can be omitted. In this case, data compression rate in the compression-rate control unit 15 is judged and controlled as follows: if medium reproduction speed is controlled to be slower than standard speed, or stopped, the medium reproduction speed is controlled so that data compression rate increases; and if the medium reproduction speed is controlled to be faster than standard speed, the medium reproduction speed is controlled so that the compression rate decreases.

It is to be noted that, in the time chart shown in FIG. 22A through 22D, effect of avoiding sound interruption during the timing period indicated by *2 can be achieved in like manner even if not the compression-rate control unit 15 but the reproduction-speed control unit 16 is used, or even if both of the compression-rate control unit 15 and the reproduction-speed control unit 16 are used.

Up to this point, the present invention was described in detail with reference to the specific embodiments. However, it is obvious that a person skilled in the art can correct or substitute the embodiments within a range that does not deviate from the points of the present invention. In other words, the present invention was disclosed in the form of exemplification. The present invention, therefore, should not be interpreted in a limited manner. In order to judge the points of the present invention, "What is claimed is:" described at the outset should be taken into consideration.

As described above in detail, according to the present invention, it is possible to provide the radio transmission device, the radio receiving device, the radio transmitting/receiving system, and the storage medium, that are outstanding and capable of transmitting a real time signal such as sound and image while keeping its data quality.

In addition, in the radio transmission system, of which effective throughput fluctuates (that is to say, it is not guaranteed) like the ACL link of the Bluetooth, the present invention can provides the radio transmission device, the radio receiving device, the radio transmitting/receiving system, and the storage medium, which are outstanding and capable of transmitting a real time signal such as sound and image while keeping data quality.

In addition, in the transmission system, of which effective throughput fluctuates like the ACL link of the Bluetooth, the present invention can provides the radio transmission device, the radio receiving device, the radio transmitting/receiving system, and the storage medium, which are outstanding and capable of transmitting a real time signal such as sound and image while keeping data quality by changing its data compression rate dynamically during a transmission period.

According to the radio transmitting/receiving system of the present invention, even if throughput of a line decreases, real-time data can be transmitted successfully without causing sound interruption, frame dropping, or the like. Moreover, a signal of high sound quality or of high image quality can be transmitted in response to effective throughput of a line.

Concerning the radio transmitting/receiving system according to the present invention, if effective throughput of a line decreases, a loss of a real-time signal such as sound interruption and frame dropping can be prevented by using easy compression rate control on a transmitting side.

In addition, according to the radio transmitting/receiving system of the present invention, sizes of memories, which accumulate transmission data temporarily on the sending side and on the receiving side respectively, can be reduced. Moreover, it is possible to cope with instantaneous interruption of the line.

What is claimed is:
1. A radio transmission device for transmitting data through a radio line, comprising:
data inputting means for inputting transmission data;
input data storing means for storing the inputted transmission data temporarily;

data compression means for reading data from the data storing means to compress the data;

data transmitting means for transmitting the compressed data through the radio line; and throughput judging means for judging throughput in the radio line.

2. A radio transmission device according to claim 1, wherein:

said input data storing means is comprised of a memory that operates using a first-in first-out method; and said throughput judging means judges throughput according to a difference between a data writing location and a data reading location of the input data storing means.

3. A radio transmission device according to claim 1, additionally comprising:

compression rate control means for controlling a data compression rate in the data compression means according to the judged throughput.

4. A radio transmission device according to claim 3, wherein:

said compression rate control means increases a data compression rate with a decrease in throughput, and decreases the data compression rate with recovery of the throughput.

5. A radio transmission device according to claim 1, additionally comprising:

input speed control means for controlling data input speed in the data inputting means according to the judged throughput.

6. A radio transmission device according to claim 5, wherein:

said input speed control means decreases data input speed with a decrease in throughput, and increases the data input speed with recovery of the throughput.

7. A radio transmission device for transmitting data through a radio line, comprising:

data inputting means for inputting transmission data;

input data storing means for storing the inputted transmission data temporarily;

data compression means for reading data from the data storing means to compress the data;

data transmitting means for transmitting the compressed data through the radio line; and input speed control means for controlling data input speed in the data inputting means.

8. A radio transmission device for transmitting data through a radio line, comprising:

data inputting means for inputting transmission data;

input data storing means for storing the inputted transmission data temporarily;

data compression means for reading data from the data storing means to compress the data;

data transmitting means for transmitting the compressed data through the radio line; and said data transmitting means performs best-effort-type packet transmission, which responds to a retransmission request.

9. A radio transmission method for transmitting data through a radio line, comprising the steps of:

a data inputting step for inputting transmission data;

an input data storing step for storing the inputted transmission data temporarily;

a data compression step for reading data from the data storing means to compress the data;

a data transmitting step for transmitting the compressed data through the radio line; and a throughput judging step for judging throughput in the radio line.

10. A radio transmission method according to claim 9, wherein:

in the input data storing step, data is written and read by means of a first-in first-out method; and in the throughput judging step, throughput is judged according to a difference between a data writing location and a data reading location of the input data storing step.

11. A radio transmission method according to claim 9, additionally comprising the step of:

a compression rate control step for controlling a data compression rate in the data compression step according to the judged throughput.

12. A radio transmission method according to claim 11, wherein:

in the compression rate control step, a data compression rate is increased with a decrease in throughput, and the data compression rate is decreased with recovery of the throughput.

13. A radio transmission method according to claim 9, additionally comprising the step of:

an input speed control step for controlling data input speed in the data inputting step according to the judged throughput.

14. A radio transmission method according to claim 13, wherein:

in the input speed control step, data input speed is decreased with a decrease in throughput, and the data input speed is increased with recovery of the throughput.

15. A radio transmission method for transmitting data through a radio line, comprising the steps of:

a data inputting step for inputting transmission data;

an input data storing step for storing the inputted transmission data temporarily;

a data compression step for reading data from the data storing means to compress the data;

a data transmitting step for transmitting the compressed data through the radio line; and an input speed control step for controlling data input speed in the data inputting step.

16. A radio transmission method for transmitting data through a radio line, comprising the steps of:

a data inputting step for inputting transmission data;

an input data storing step for storing the inputted transmission data temporarily;

a data compression step for reading data from the data storing means to compress the data;

a data transmitting step for transmitting the compressed data through the radio line; and in the data transmitting step, best-effort-type packet transmission, which responds to a retransmission request, is performed.

17. A radio receiving device for receiving data through a radio line, comprising:

data receiving means for receiving compressed data through the radio line;

data decompressing means for decompressing the received data;

output data storing means for storing the decompressed data temporarily;

data outputting means for reading data from the output data storing means to output the data; and throughput judging means for judging throughput in the radio line.

18. A radio receiving device according to claim 17, wherein:
said output data storing means is comprised of a memory that operates using a first-in first-out method; and
said throughput judging means judges throughput according to a difference between a data writing location and a data reading location of the output data storing means.

19. A radio receiving device according to claim 17, additionally comprising:
output speed control means for controlling data output speed in the data outputting means according to the judged throughput.

20. A radio receiving device according to claim 19, wherein:
said output speed control means decreases data output speed with a decrease in throughput, and increases the data output speed with recovery of the throughput.

21. A radio receiving device for receiving data through a radio line, comprising:
data receiving means for receiving compressed data through the radio line;
data decompressing means for decompressing the received data;
output data storing means for storing the decompressed data temporarily;
data outputting means for reading data from the output data storing means to output the data; and
output speed control means for controlling data output speed in the data outputting means.

22. A radio receiving device according to claim 21, wherein:
said data outputting means records data, which has been read from the output data storing means, on a given storage medium; and
said output speed control means controls data recording speed for recording on the storage medium.

23. A radio receiving device for receiving data through a radio line, comprising:
data receiving means for receiving compressed data through the radio line;
data decompressing means for decompressing the received data;
output data storing means for storing the decompressed data temporarily;
data outputting means for reading data from the output data storing means to output the data; and
said data receiving means performs best-effort-type packet transmission that issues a retransmission request in response to occurrence of a packet receiving error.

24. A radio receiving method receiving data through a radio line, comprising the steps of:
a data receiving step for receiving compressed data through the radio line;
a data decompressing step for decompressing the received data;
an output data storing step for storing the decompressed data temporarily;
a data outputting step for reading data, which has been stored temporarily, to output the data; and
a throughput judging step for judging throughput in the radio line.

25. A radio receiving method according to claim 24, wherein:
in the output data storing step, data is stored by means of a first-in first-out method; and
in the throughput judging step, throughput is judged according to a difference between a data writing location and a data reading location of the output data storing step.

26. A radio receiving method according to claim 24, additionally comprising the step of:
an output speed control step for controlling data output speed in the data outputting step according to the judged throughput.

27. A radio receiving method according to claim 26, wherein:
in the output speed control step, data output speed is decreased with a decrease in throughput, and the data output speed is increased with recovery of the throughput.

28. A radio receiving method receiving data through a radio line, comprising the steps of:
a data receiving step for receiving compressed data through the radio line;
a data decompressing step for decompressing the received data;
an output data storing step for storing the decompressed data temporarily;
a data outputting step for reading data, which has been stored temporarily, to output the data; and
an output speed control step for controlling data output speed in the data outputting step.

29. A radio receiving method according to claim 28, wherein:
in the data outputting step, data, which has been read in the output data storing step, is recorded on a given storage medium; and
in the output speed control step, data recording speed for recording on the storage medium is controlled.

30. A radio receiving method receiving data through a radio line, comprising the steps of:
a data receiving step for receiving compressed data through the radio line;
a data decompressing step for decompressing the received data;
an output data storing step for storing the decompressed data temporarily;
a data outputting step for reading data, which has been stored temporarily, to output the data; and
in the data receiving step, best-effort-type packet transmission, which issues a retransmission request in response to occurrence of a packet receiving error, is performed.

31. A radio transmitting/receiving system for transmitting data through a radio line, comprising:
a radio transmission unit comprising:
data inputting means for inputting transmission data;
input data storing means for storing the inputted transmission data temporarily by means of a first-in first-out method;
data compression means for reading data from the data storing means to compress the data; and
data transmitting means for transmitting the compressed data through the radio line;
a radio receiving unit comprising:
data receiving means for receiving transmission data through the radio line;
data decompressing means for decompressing the received data;

output data storing means for storing the decompressed data temporarily by means of a first-in first-out method;

data outputting means for reading data from the output data storing means to output the data; and throughput judging means for judging throughput in the radio line according to a difference between a data writing location and a data reading location of the input data storing means and/or the output data storing means.

32. A radio transmitting/receiving system for transmitting data through a radio line, comprising:

a radio transmission unit comprising:

data inputting means for inputting transmission data;

input data storing means for storing the inputted transmission data temporarily by means of a first-in first-out method;

data compression means for reading data from the data storing means to compress the data; and data transmitting means for transmitting the compressed data through the radio line;

a radio receiving unit comprising:

data receiving means for receiving transmission data through the radio line;

data decompressing means for decompressing the received data;

output data storing means for storing the decompressed data temporarily by means of a first-in first-out method;

data outputting means for reading data from the output data storing means to output the data; and throughput judging means for judging throughput in the radio line;

compression rate control means for controlling a data compression rate in the data compression means according to throughput in the radio line; and compression rate notifying means for notifying the radio receiving unit of a compression rate parameter that has been used in the data compression means; wherein:

said data decompressing means performs data decompression processing according to the notified compression rate parameter.

33. A radio transmitting/receiving system for transmitting data through a radio line, comprising:

a radio transmission unit comprising:

data inputting means for inputting transmission data;

input data storing means for storing the inputted transmission data temporarily by means of a first-in first-out method;

data compression means for reading data from the data storing means to compress the data; and data transmitting means for transmitting the compressed data through the radio line;

a radio receiving unit comprising:

data receiving means for receiving transmission data through the radio line;

data decompressing means for decompressing the received data;

output data storing means for storing the decompressed data temporarily by means of a first-in first-out method;

data outputting means for reading data from the output data storing means to output the data; and said compression rate control means increases a data compression rate with a decrease in throughput, and decreases the data compression rate with recovery of the throughput.

34. A radio transmitting/receiving system for transmitting data through a radio line, comprising:

a radio transmission unit comprising:

data inputting means for inputting transmission data;

input data storing means for storing the inputted transmission data temporarily by means of a first-in first-out method;

data compression means for reading data from the data storing means to compress the data; and data transmitting means for transmitting the compressed data through the radio line;

a radio receiving unit comprising:

data receiving means for receiving transmission data through the radio line;

data decompressing means for decompressing the received data;

output data storing means for storing the decompressed data temporarily by means of a first-in first-out method;

data outputting means for reading data from the output data storing means to output the data; and throughput judging means for judging throughput in the radio line; and input speed control means for controlling data input speed in the data inputting means according to throughput in the radio line.

35. A radio transmitting/receiving system according to claim 34, wherein:

said input speed control means decreases data input speed with a decrease in throughput, and increases the data input speed with recovery of the throughput.

36. A radio transmitting/receiving system for transmitting data through a radio line, comprising:

a radio transmission unit comprising:

data inputting means for inputting transmission data;

input data storing means for storing the inputted transmission data temporarily by means of a first-in first-out method;

data compression means for reading data from the data storing means to compress the data; and data transmitting means for transmitting the compressed data through the radio line;

a radio receiving unit comprising:

data receiving means for receiving transmission data through the radio line;

data decompressing means for decompressing the received data;

output data storing means for storing the decompressed data temporarily by means of a first-in first-out method:

data outputting means for reading data from the output data storing means to output the data; and throughput judging means for judging throughput in the radio line; and output speed control means for controlling data output speed in the data outputting means according to the judged throughput.

37. A radio transmitting/receiving system according to claim 36, wherein:

said output speed control means decreases data output speed with a decrease in throughput, and increases the data output speed with recovery of the throughput.

38. A radio transmitting/receiving system for transmitting data through a radio line, comprising:

a radio transmission unit comprising:

data inputting means for inputting transmission data;

input data storing means for storing the inputted transmission data temporarily by means of a first-in first-out method;

data compression means for reading data from the data storing means to compress the data; and data transmitting means for transmitting the compressed data through the radio line;

a radio receiving unit comprising:

data receiving means for receiving transmission data through the radio line;

data decompressing means for decompressing the received data;

output data storing means for storing the decompressed data temporarily by means of a first-in first-out method;

data outputting means for reading data from the output data storing means to output the data; and said data transmitting means and said data receiving means perform best-effort-type packet transmission, by which retransmission is controlled in response to occurrence of a transmission data error.

* * * * *